United States Patent
Iio et al.

(10) Patent No.: US 10,783,402 B2
(45) Date of Patent: Sep. 22, 2020

(54) INFORMATION PROCESSING APPARATUS, INFORMATION PROCESSING METHOD, AND STORAGE MEDIUM FOR GENERATING TEACHER INFORMATION

(71) Applicant: CANON KABUSHIKI KAISHA, Tokyo (JP)

(72) Inventors: Yuichiro Iio, Tokyo (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 102 days.

(21) Appl. No.: 16/180,631

(22) Filed: Nov. 5, 2018

(65) Prior Publication Data

US 2019/0138852 A1    May 9, 2019

(30) Foreign Application Priority Data

Nov. 7, 2017   (JP) ................ 2017-214625

(51) Int. Cl.
    *G06K 9/00*        (2006.01)
    *G06K 9/62*        (2006.01)
    *G06N 5/04*        (2006.01)
    *G06N 20/00*      (2019.01)

(52) U.S. Cl.
    CPC ......... *G06K 9/6259* (2013.01); *G06K 9/6215* (2013.01); *G06K 9/6262* (2013.01); *G06K 9/6264* (2013.01); *G06N 5/048* (2013.01); *G06N 20/00* (2019.01)

(58) Field of Classification Search
CPC .. G06K 9/6259; G06K 9/6215; G06K 9/6262; G06K 9/6264; G06K 9/6255; G06K 9/6253; G06K 9/62; G06K 9/628; G06K 9/6254; G06K 9/66; G06N 20/00; G06N 20/20; G06N 20/10; G06N 5/048; G06N 3/0472; G06N 3/08; G06N 3/084; G06N 3/088; G06N 7/005; G06F 17/18; G06F 16/313; G06F 16/93; G06T 2207/20081
See application file for complete search history.

(56) References Cited

U.S. PATENT DOCUMENTS

| | | | |
|---|---|---|---|
| 2014/0177947 | A1 | 6/2014 | Krizhevsky |
| 2018/0060722 | A1* | 3/2018 | Hwang ................ G06N 3/0454 |
| 2018/0189581 | A1* | 7/2018 | Turcot ................. G06K 9/4628 |
| 2018/0276568 | A1* | 9/2018 | Takahashi ............... G06F 16/93 |
| 2018/0285736 | A1* | 10/2018 | Baum .................. G06N 3/0454 |
| 2018/0330258 | A1* | 11/2018 | Harris .................... G06N 20/00 |
| 2020/0019875 | A1* | 1/2020 | Koshinaka ............. G06N 20/00 |

OTHER PUBLICATIONS

Zhangyang Wang et al; Brain-Inspired Deep Networks for Image Aesthetics Assessment; Beckman Institute University of Illinois at Urbana-Champaign, Urbana IL; Mar. 2016 pp. 1-16.

* cited by examiner

*Primary Examiner* — Jose L Couso
(74) *Attorney, Agent, or Firm* — Canon U.S.A., Inc. IP Division

(57) ABSTRACT

An information processing apparatus performs estimation processing on supervised data, and stores a relationship between teacher information and an estimation result. When unsupervised data is input, the information processing apparatus searches for supervised data high in degree of similarity in estimation result to unsupervised data, and generates teacher information from an estimation result of unsupervised data based on a relationship between teacher information and an estimation result about the detected supervised data.

20 Claims, 14 Drawing Sheets

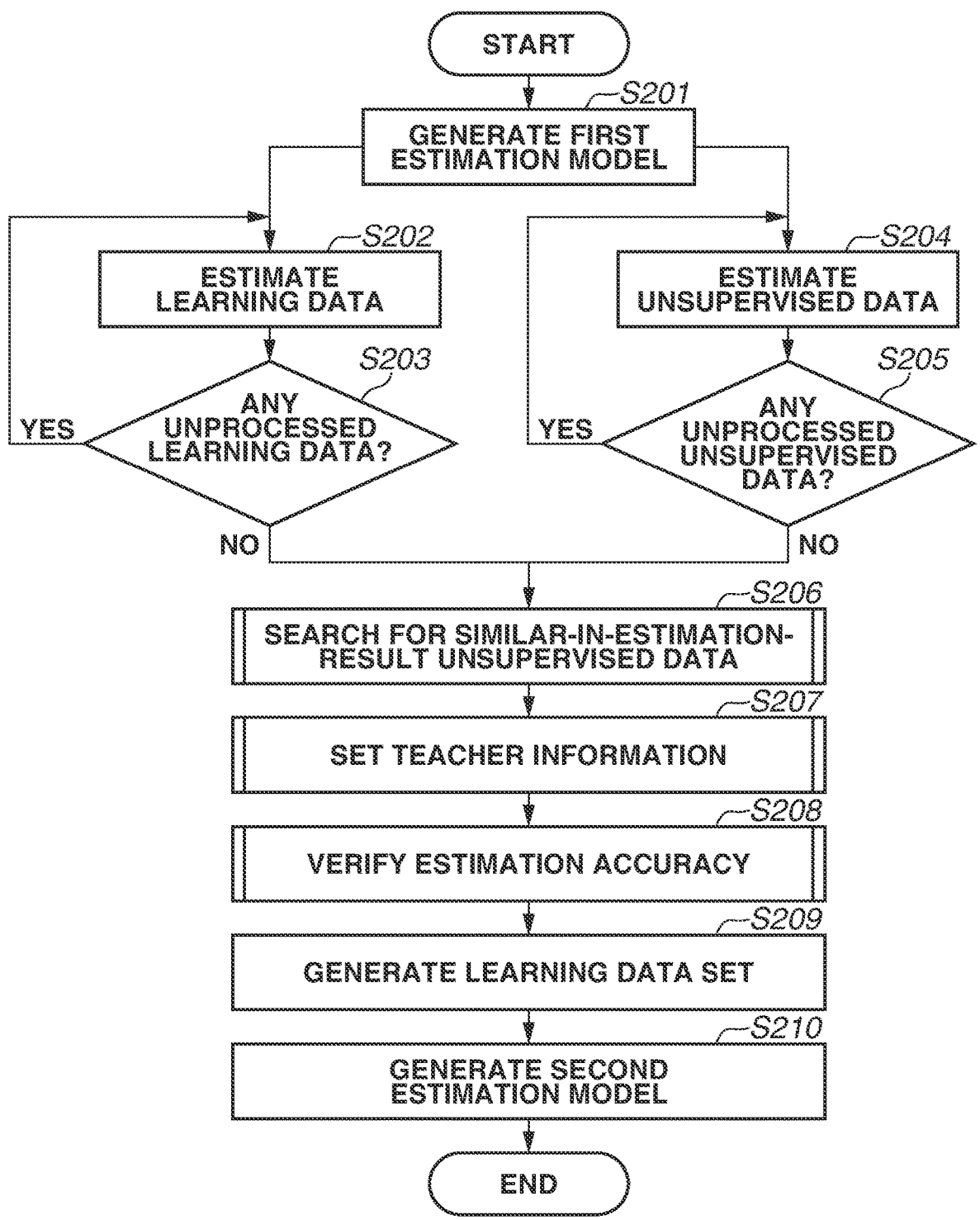

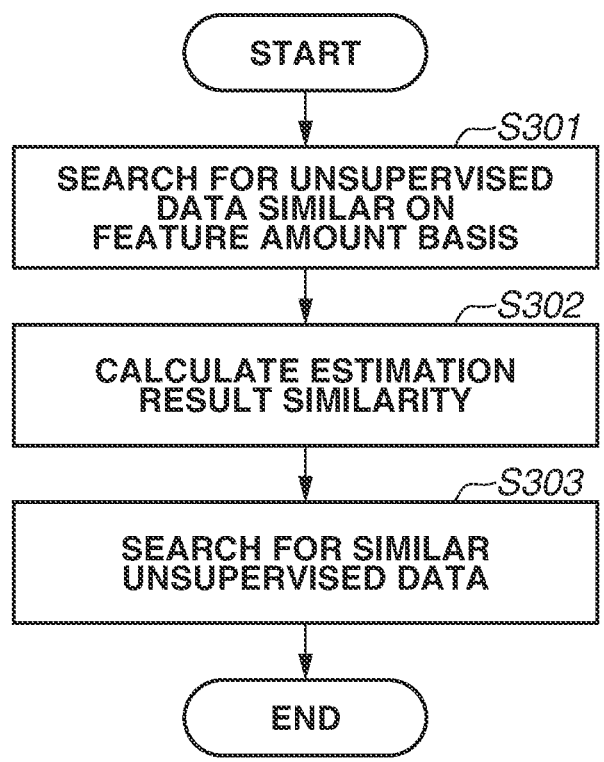

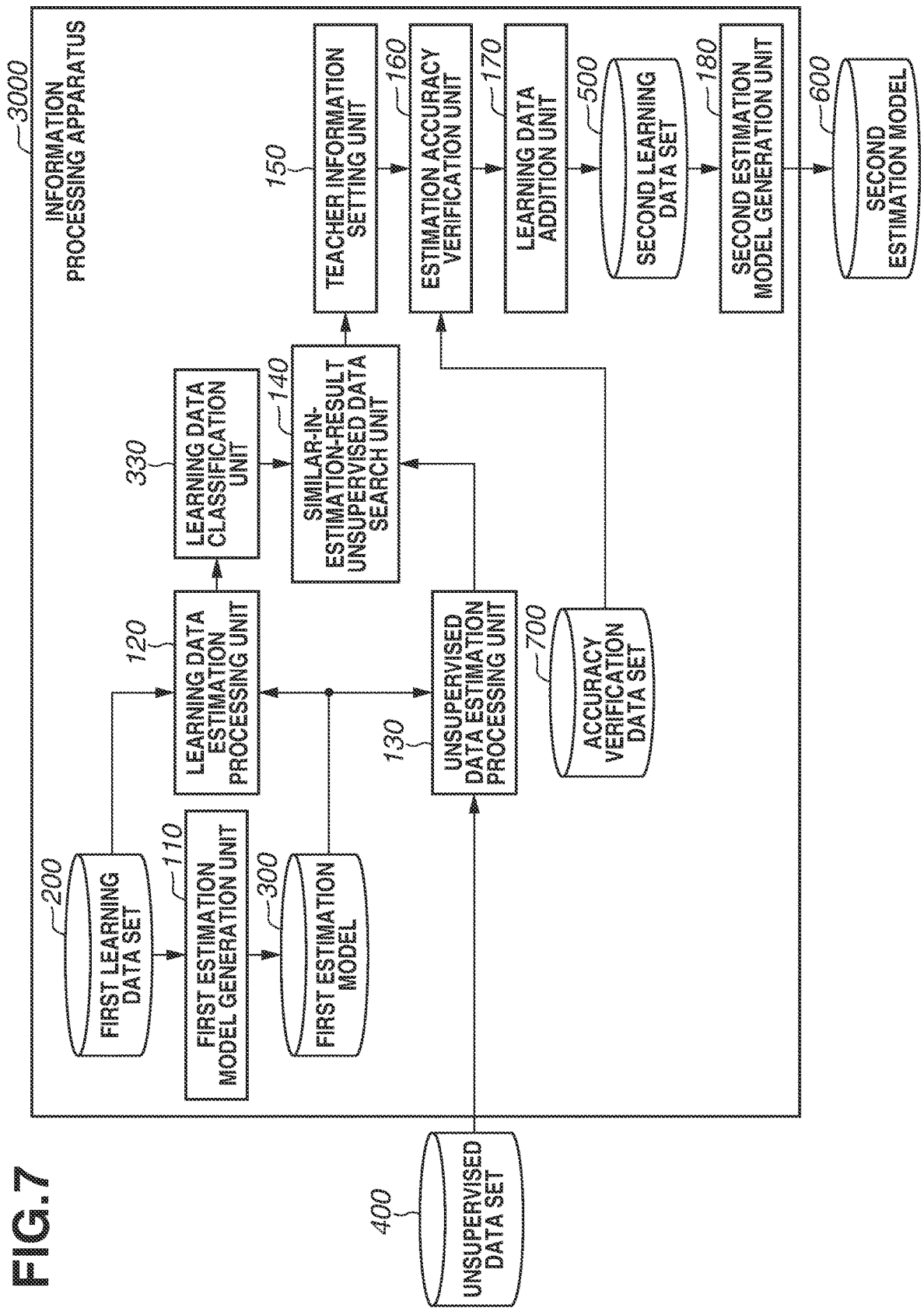

INFORMATION PROCESSING APPARATUS, INFORMATION PROCESSING METHOD, AND STORAGE MEDIUM FOR GENERATING TEACHER INFORMATION

BACKGROUND

Field of the Disclosure

Aspects of the present disclosure generally relate to a technique to generate teacher information for data used for machine learning, and, more particularly, to a teacher information generation technique to assign pseudo teacher information to unsupervised data through the use of teacher information about learning data.

Description of the Related Art

In learning in an estimator using machine learning, to produce a high-performance estimator, a large amount of supervised data is required. However, humans assigning teacher information to a large amount of data may be a troublesome task and, therefore, may be unrealistic. Accordingly, there is known a method of increasing data used for learning through the use of a small amount of supervised data. United States Patent Publication Application No. 2014/0177947 discusses a method of increasing learning images by generating a new image which is obtained by performing deformation of a color space on an existing supervised image, associating teacher information about the original supervised image with the generated new image, and adding the thus-processed new image to a learning image set. This method deforms the color space of the original supervised image, and is, therefore, unable to be applied to an evaluation target in which teacher information varies according to color information. Examples of the evaluation target in which teacher information varies according to color information include the assessment of aesthetic degree of photographs discussed in Z. Wang, F. Dolcos, D. Beck, S. Chang, and T. Huang, "Brain-Inspired Deep Networks for Image Aesthetics Assessment", arXiv:1601.04155, 2016. The aesthetic degree of photographs is an index indicating the degree of beauty or favorability which humans feel when viewing a photograph. The aesthetic degree may easily vary according to optional image processing performed on the original image.

With respect to such a data set in which it is difficult to increase learning data from existing supervised data, there is known a method called "semi-supervised learning" of using unsupervised data to perform learning. Examples of the semi-supervised learning include a method called "self-training". Self-training learns an estimation model using only previously-prepared supervised data and performs estimation processing on unsupervised data with use of the generated estimation model. In a case where the reliability of a result of this estimation processing exceeds a given threshold value, self-training regards the estimation result as teacher information about an unsupervised image, adds the teacher information to a learning image set, and then re-performs learning.

Usually, in the case of estimating a classification problem, teacher information which is assigned to unsupervised data when the method of self-training is used is a class label. Therefore, in a classification problem, with respect to unsupervised data, in a case where the estimation of a class label to be assigned is erroneous, relearning is performed with use of erroneous teacher information, and, in a case where the estimation of a class label to be assigned is correct, there occurs no error from a true value. In the case of estimating a regression problem, teacher information which is assigned to unsupervised data when the method of self-training is used becomes a continuous value which is a result of estimation. With respect to an estimation result of a continuous value, there occurs an error from a true value in most cases. Therefore, at the time of relearning, a learning data set including unsupervised data having teacher information in which an error is included is used to perform learning, and, as a result, a decrease in accuracy of an estimation model may be caused.

SUMMARY

According to an aspect of the present disclosure, an information processing apparatus includes a first estimation model generation unit configured to generate a first estimation model for estimating evaluation information about input data with use of a plurality of pieces of learning data having evaluation information as teacher information, a first evaluation information estimation unit configured to estimate evaluation information about each of the plurality of pieces of learning data with use of the first estimation model, associate the estimated evaluation information with corresponding learning data, and store the estimated evaluation information associated therewith, a second evaluation information estimation unit configured to estimate evaluation information about unsupervised data with use of the first estimation model, an association unit configured to associate unsupervised data with learning data based on a degree of similarity between an estimation result of evaluation information about the learning data and an estimation result of evaluation information about the unsupervised data, a setting unit configured to set teacher information for unsupervised data based on the learning data associated with the unsupervised data, and a second estimation model generation unit configured to generate a second estimation model for estimating evaluation information about input data with use of a plurality of pieces of learning data having the teacher information and the unsupervised data with the teacher information set thereto.

Further features of the present disclosure will become apparent from the following description of exemplary embodiments with reference to the attached drawings.

BRIEF DESCRIPTION OF THE DRAWINGS

FIG. 2 is a flowchart illustrating estimation model generation processing,

FIG. 3 is a flowchart illustrating search processing for similar-in-estimation-result unsupervised data.

FIG. 7 is a diagram illustrating an example of a functional configuration of an information processing apparatus.

DESCRIPTION OF THE EMBODIMENTS

Figure 1:
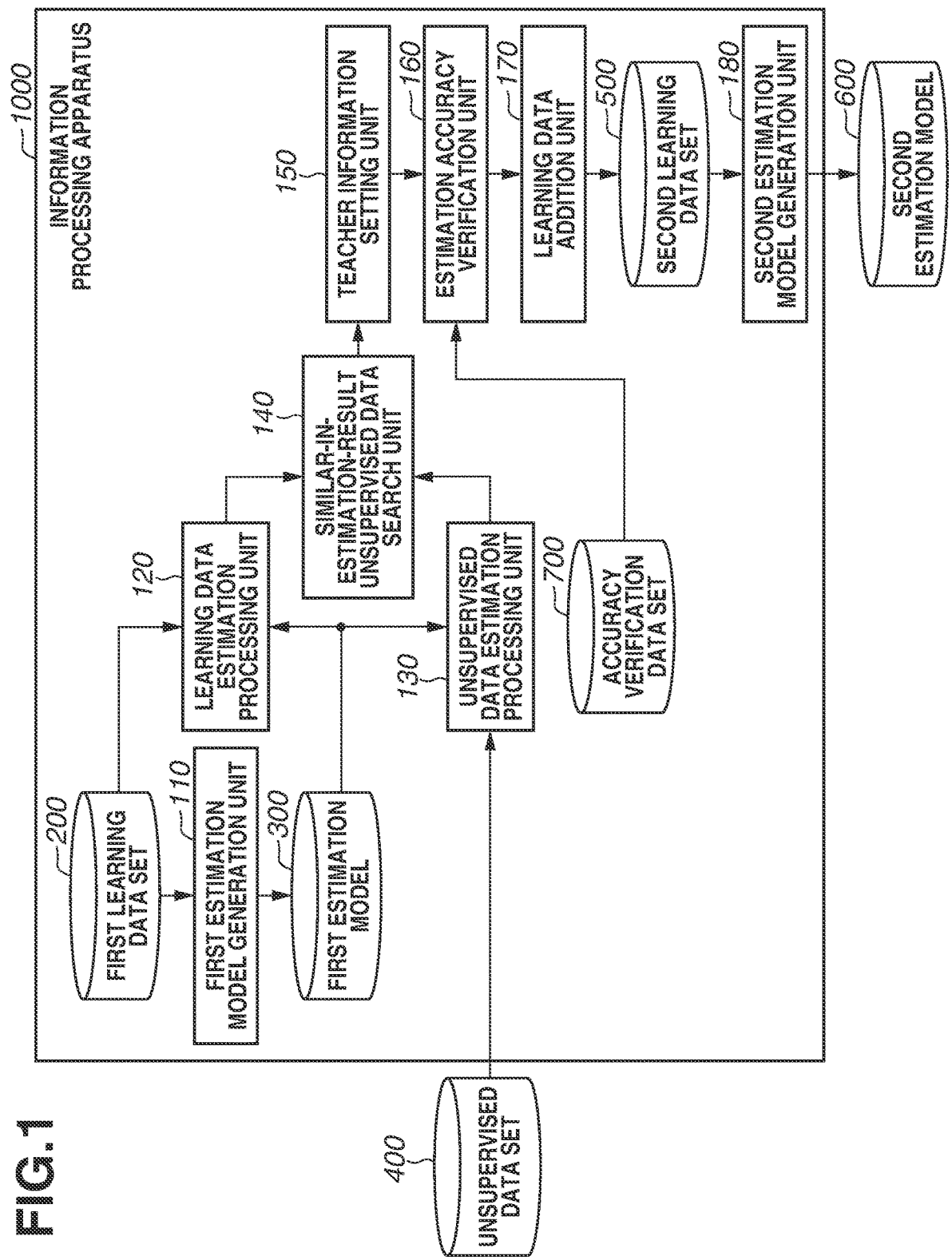
FIG. 1 is a diagram illustrating an example of a functional configuration of an information processing apparatus.

Various exemplary embodiments, features, and aspects of the disclosure will be described in detail below with reference to the drawings.

An information processing apparatus according to an exemplary embodiment of the present disclosure learns an estimator which estimates multivalued information which is a continuous value. The information processing apparatus automatically appends teacher information to unsupervised data, adds the unsupervised data with the teacher information appended thereto to a previously-prepared learning data set, and performs learning. Here, the case of estimating a user satisfaction index for photographs is described as an example. The user satisfaction index is an index indicating such a degree of satisfaction as how a user who has viewed a photograph likes the photograph. For example, the user satisfaction index is a comprehensive index which is determined based on multiple factors, such as a subject shown in a photograph, a locational relationship of the subject, and coloring of the subject, and aesthetic is also a factor involved in the user satisfaction. A photograph which is used as learning data in the present exemplary embodiment is previously evaluated with respect to the degree of satisfaction by a plurality of evaluating persons on a scale of one to X. X is an integer. For example, in a case where X is "3", the evaluating persons evaluate a target photograph on a scale of 1 to 3 (for example, good/medium/bad). A histogram of X bins which is an evaluation distribution of degrees of satisfaction evaluated by a plurality of evaluating persons (evaluation information) is used for teacher information about learning data. The histogram is previously normalized with the number of evaluating persons in such a manner that the total of values of bins becomes "1". In the present exemplary embodiment, information to be estimated is assumed to be a normalized histogram which is a user satisfaction index.

The value of each bin of the normalized histogram is a continuous value. Therefore, the estimation of a user satisfaction index serves as a regression problem in which the user satisfaction index is estimated as real numbers corresponding to the number of bins of the histogram. In the case of a regression problem, a continuous value which is an estimation result of unsupervised data may have an error occurring from a true value in most instances. Therefore, in a case where an estimation result of unsupervised data is used as teacher information in semi-supervised learning, in which unsupervised data is used for learning, learning would be performed with use of teacher information containing an error, thus leading to a decrease in accuracy of an estimation model.

The information processing apparatus according to the present exemplary embodiment also performs estimation processing on learning data having teacher information, and stores a relationship between the teacher information and an estimation result containing an error. The information processing apparatus searches for learning data similar in estimation result to unsupervised data, and generates teacher information about unsupervised data based on teacher information about the searched-for learning data. This reduces the influence of an error caused by estimation processing in teacher information. The information processing apparatus is a computer system including a central processing unit (CPU), a read-only memory (ROM), and a random access memory (RAM). The information processing apparatus implements various functions in the present exemplary embodiment by executing a computer program stored in the ROM with the RAM used as a work area. Furthermore, the technical scope of the present disclosure is not limited to exemplary embodiments thereof, but covers things set forth in the claims and the range of equivalents thereof. While, in the present exemplary embodiment, the term "data" serving as an evaluation target refers to a photograph, in the present disclosure, the "data" is not limited to an image.

FIG. 1 is a diagram illustrating an example of a functional configuration of an information processing apparatus according to a first exemplary embodiment. The information processing apparatus 1000 functions as a first estimation model generation unit 110, a learning data estimation processing unit 120, an unsupervised data estimation processing unit 130, a similar-in-estimation-result unsupervised data search unit 140, and a teacher information setting unit 150. Moreover, the information processing apparatus 1000 functions as an estimation accuracy verification unit 160, a learning data addition unit 170, and a second estimation model generation unit 180. Furthermore, the information processing apparatus 1000 includes a first learning data set 200, which is used for generation of a first estimation model, and an accuracy verification data set 700. The first learning data set 200 and the accuracy verification data set 700 are stored in a predetermined storage. To the information processing apparatus 1000 configured as described above, a storage storing an unsupervised data set 400, which is composed of one or more pieces of unsupervised data, is connected. The information processing apparatus 1000 outputs a second estimation model 600 as a processing result. The second estimation model 600 is stored in a predetermined storage.

The first learning data set 200 is a data set composed of a plurality of pieces of learning data including teacher information. Since a user satisfaction index, which is information to be estimated in the first exemplary embodiment, is greatly affected by scene categories of images, learning data included in the first learning data set 200 is set according to the scene category of an envisaged input image. The scene categories of images are classification results that are based on subjects to be image-captured or image capturing situations. Specifically, the scene categories of images include various categories depending on elements of interest, such as abstract categories, including "landscape" and "portrait", categories focused on an image capturing target, including "firework" and "autumn foliage", and categories focused on a situation, including "wedding ceremony" and "athletic meet". The scene categories allow a plurality of labels to be assigned to one image.

For example, in a case where only images of the landscape category are present in a learning image data set, it is difficult to estimate a user satisfaction index for a portrait image. Therefore, to deal with any optional input image, it is desirable that learning images of a plurality of categories be evenly present in the first learning data set 200. In a case where there is a prerequisite in which only images of a particular category are acquired as inputs, if learning data of a different category is included in a learning data set, a decrease in estimation accuracy is caused. Therefore, in this case, the first learning data set 200 is composed of only images of a target category.

The accuracy verification data set 700 is composed of a plurality of pieces of data which is not included in the first learning data set 200. Each piece of data included in the accuracy verification data set 700 also includes teacher information, as with the first learning data set 200. It is desirable that the scene category distribution of an image set included in the accuracy verification data set 700 be similar to the scene category distribution of an image set included in the first learning data set 200.

The first estimation model generation unit 110 performs learning with use of the first learning data set 200, thus generating a first estimation model 300. The first estimation model 300 is stored in a predetermined storage. A plurality of learning data constituting the first learning data set 200 includes a normalized histogram, which is a user satisfaction index, as teacher information. The first estimation model 300 acquires an image as input data, and outputs a normalized histogram, which is a user satisfaction index, as an estimation result.

The learning data estimation processing unit (first evaluation information estimation) 120 performs estimation processing using the first estimation model 300 on all of the pieces of learning data included in the first learning data set 200. The learning data estimation processing unit 120 stores an estimated user satisfaction index, which is an estimation result, in association with every corresponding learning data.

The unsupervised data estimation processing unit (second evaluation information estimation unit) 130 receives, as an input, the unsupervised data set 400, which is composed of one or more pieces of unsupervised data. The unsupervised data estimation processing unit 130 performs estimation processing using the first estimation model 300 on all of the pieces of unsupervised data included in the unsupervised data set 400. The unsupervised data estimation processing unit 130 stores an estimated user satisfaction index, which is an estimation result, in association with every corresponding unsupervised data.

The similar-in-estimation-result unsupervised data search unit (association unit) 140 searches for unsupervised data similar in estimation result to learning data included in the first learning data set 200, with use of the estimated user satisfaction index of learning data and the estimated user satisfaction index of unsupervised data. The similar-in-estimation-result unsupervised data search unit 140 associates the searched-for unsupervised data and the learning data having the highest degree of similarity in estimation result with each other.

The teacher information setting unit 150 derives and sets teacher information about unsupervised data based on a relationship between teacher information about the learning data associated with the unsupervised data by the similar-in-estimation-result unsupervised data search unit 140 and the estimated user satisfaction index. The estimation accuracy verification unit 160 adds the unsupervised data with the teacher information set thereto by the teacher information setting unit 150 to learning data included in the first learning data set 200 and then performs learning, thus verifying the estimation accuracy of an estimation model output with use of the accuracy verification data set 700. In a case where the estimation accuracy is equal to or greater than a threshold value, the estimation accuracy verification unit 160 adds the unsupervised data to a learning data addition list.

The learning data addition unit 170 adds together the unsupervised data included in the learning data addition list generated by the estimation accuracy verification unit 160 and the learning data included in the first learning data set 200, thus generating a second learning data set 500. The second estimation model generation unit 180 performs learning with use of the second learning data set 500, thus generating the second estimation model 600.

FIG. 2 is a flowchart illustrating estimation model generation processing performed by the information processing apparatus 1000 configured described above.

In step S201, the first estimation model generation unit 110 performs learning with use of the first learning data set 200, which is previously prepared, thus generating the first estimation model 300. The first estimation model generation unit 110 uses known methods to perform feature extraction from learning data and generation of an estimation model. For example, in a case where target data is an image, the first estimation model generation unit 110 uses deep learning as an example of a learning technique.

In step S202, the learning data estimation processing unit 120 performs estimation processing with use of the first estimation model 300 on learning data included in the first learning data set 200. The learning data estimation processing unit 120 stores the estimated user satisfaction index for every piece of selected learning data. In step S203, the learning data estimation processing unit 120 searches the first learning data set 200 for learning data with respect to which the estimated user satisfaction index has not yet been stored. If learning data in which the estimated user satisfaction index has not yet been included has been detected (YES in step S203), the processing returns to step S202, in which the learning data estimation processing unit 120 performs learning data estimation processing on the detected learning data. According to processing in steps S202 and S203, the learning data estimation processing unit 120 stores a user satisfaction index which is a result obtained by humans actually performing evaluation and the estimated user satisfaction index obtained with use of the first estimation model 300, with respect to all of the pieces of learning data included in the first learning data set 200.

In parallel with processing performed by the learning data estimation processing unit 120 as described above, in step S204, the unsupervised data estimation processing unit 130 performs estimation processing with use of the first estimation model 300 on unsupervised data included in the unsupervised data set 400, which is previously prepared. The unsupervised data estimation processing unit 130 stores the user satisfaction index obtained by estimation processing as the estimated user satisfaction index of the unsupervised data. In step S205, the unsupervised data estimation processing unit 130 searches the unsupervised data set 400 for unsupervised data in which the estimated user satisfaction index has not yet been stored. If unsupervised data in which the estimated user satisfaction index has not yet been included has been detected (YES in step S205), the processing returns to step S204, in which the unsupervised data estimation processing unit 130 performs estimation processing on the detected unsupervised data. According to processing in steps S204 and S205, the unsupervised data estimation processing unit 130 stores the estimated user satisfaction index obtained with use of the first estimation model 300, with respect to all of the pieces of unsupervised data included in the unsupervised data set 400.

In a case where the estimated user satisfaction index has been calculated with respect to all of the pieces of learning data (NO in step S203) and the estimated user satisfaction index has been calculated with respect to all of the pieces of unsupervised data (NC) in step S205), the information processing apparatus 1000 proceeds to next processing. In step S206, the similar-in-estimation-result unsupervised data search unit 140 searches for unsupervised data similar in estimation result to learning data included in the first learning data set 200, and associates each piece of unsupervised data with learning data having the highest degree of similarity in estimation result. Details of search processing for similar-in-estimation-result unsupervised data in step S206 are described below.

In step S207, the teacher information setting unit 150 derives and sets teacher information about the learning data associated in step S206, as teacher information about unsupervised data. In step S208, the estimation accuracy verification unit 160 verifies the estimation accuracy of an estimation model obtained in a case where learning is performed, with use of the accuracy verification data set 700 and unsupervised data. The estimation accuracy verification unit 160 adds unsupervised data to the learning data addition list according to processing in step S208. Details of verification processing for the estimation accuracy in step S208 are described below.

In step S209, the learning data addition unit 170 generates the second learning data set 500 based on unsupervised data written in the learning data addition list and learning data included in the first learning data set 200. In step S210, the second estimation model generation unit 180 performs learning using the second learning data set 500, thus generating the second estimation model 600. The second estimation model generation unit 180 generates the second estimation model 600 by performing learning similar to the learning performed in processing performed in step S201. The second estimation model generation unit 180 outputs the generated second estimation model 600.

Furthermore, in a case where no piece of unsupervised data has been added to the learning data addition list in processing performed in step S208, the second learning data set 500 is completely consistent with the first learning data set 200. Therefore, an increase in accuracy of an estimation model caused by the addition of unsupervised data to learning data cannot be expected. In this case, the information processing apparatus 1000 outputs an estimation model generated with use of only previously-prepared supervised data for learning, as the second estimation model 600.

Figure 4A:
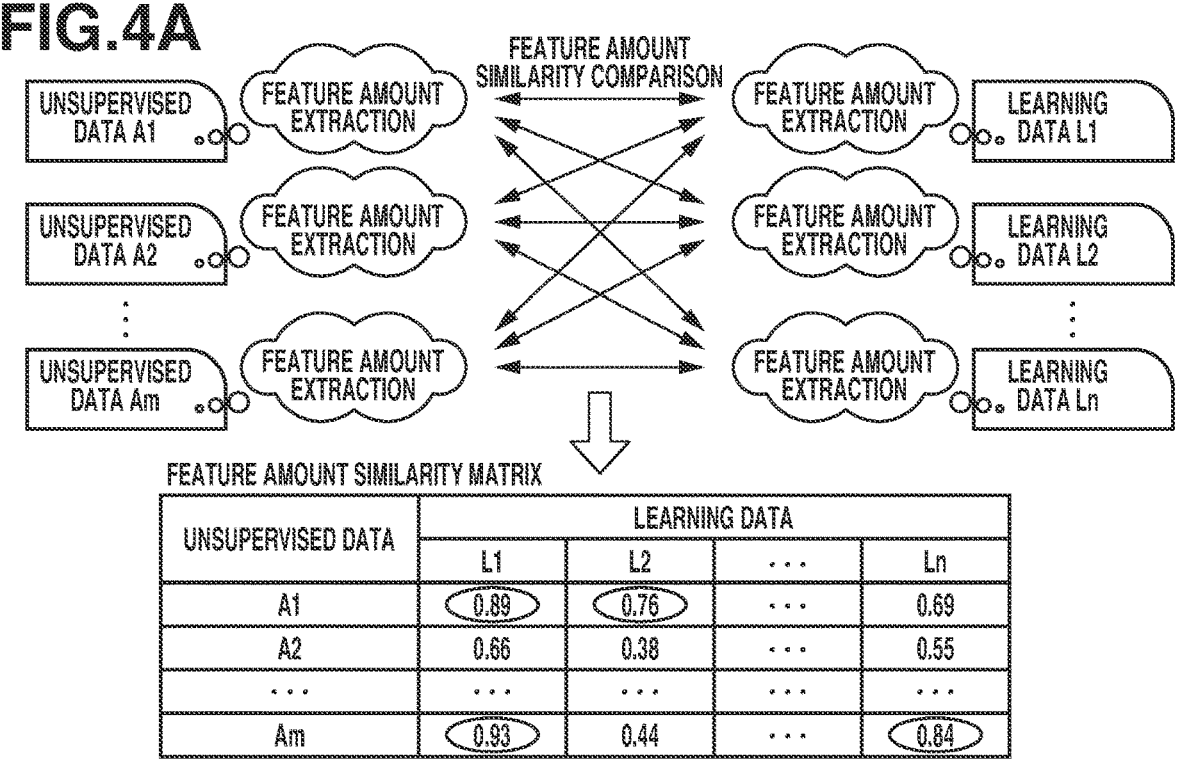
FIGS. 4A and 4B are explanatory diagrams of search processing for similar-in-estimation-result unsupervised data.
Figure 4B:
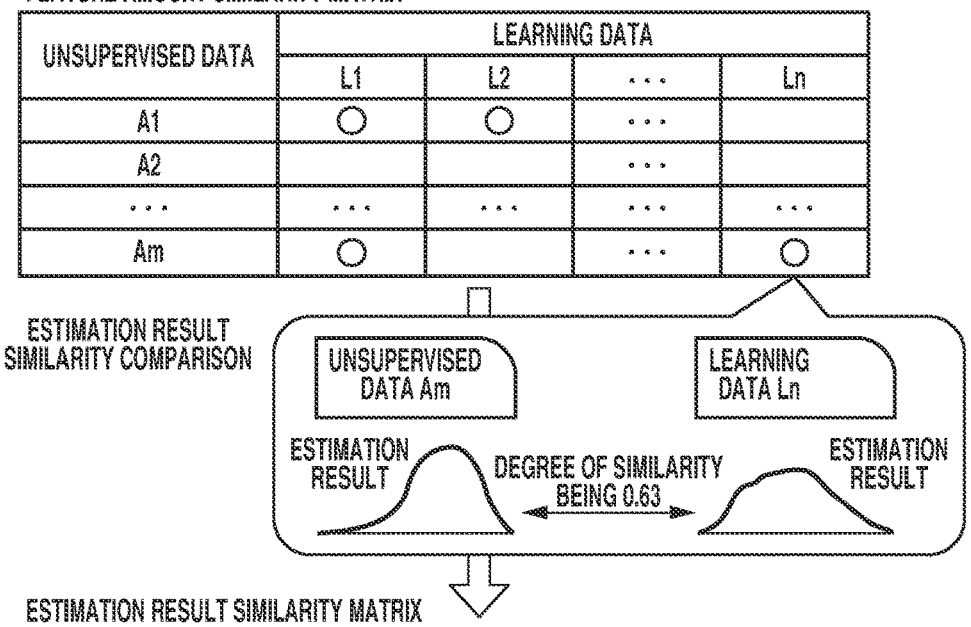

FIG. 3 is a flowchart illustrating search processing for similar-in-estimation-result unsupervised data in step S206. FIGS. 4A and 4B are explanatory diagrams of search processing for similar-in-estimation-result unsupervised data.

In step S301, the similar-in-estimation-result unsupervised data search unit 140 acquires a plurality of pieces of unsupervised data similar to learning data on a feature amount basis. The feature amount used for similar data search is a feature amount corresponding to information to be estimated. For example, examples of a feature amount used in the case of an image include a color histogram and a scale-invariant feature transform (SIFT) feature amount. Since a user satisfaction, which is an estimation target in the present exemplary embodiment, is an index which is greatly affected by, for example, a composition of a photograph, an object shown therein, and coloring thereof, it is effective to use a feature amount obtained by extracting such a factor.

FIG. 4A is a schematic diagram of search processing for similar data on a feature amount basis. FIG. 4A illustrates the manner of performing feature amount extraction from M pieces of unsupervised data A1 to Am and N pieces of learning data L1 to Ln and calculating the degree of similarity of the extracted feature amount. The degree of similarity in feature amount is expressed by a real number of 0 or more and 1 or less. In a case where the degree of similarity is "1", two images are completely consistent with each other. The similar-in-estimation-result unsupervised data search unit 140 is able to calculate the degree of similarity in feature amount with use of a similarity index which varies according to the extracted feature amount. For example, in a case where a color histogram feature amount is used, the similar-in-estimation-result unsupervised data search unit 140 calculates the degree of inter-image similarity with use of a histogram intersection, which is a similarity index between histograms. In a case where a SIFT feature amount is used, the similar-in-estimation-result unsupervised data search unit 140 calculates the degree of inter-image similarity with use of a method called "Bag of Features".

The similar-in-estimation-result unsupervised data search unit 140 selects a pair of unsupervised data and learning data about which the calculated degree of inter-image similarity is equal to or greater than a threshold value, as a similar image pair. In FIG. 4A, the threshold value is "0.75". As a pair in which the degree of similarity between learning data and unsupervised data is equal to or greater than the threshold value, a pair of learning data L1 and unsupervised data A1, a pair of learning data L1 and unsupervised data Am, a pair of learning data L2 and unsupervised data A1, and a pair of learning data Ln and unsupervised data Am are selected. Processing in step S301 is directed to extracting unsupervised data similar to learning data.

In step S302, the similar-in-estimation-result unsupervised data search unit 140 calculates the degree of similarity in estimated user satisfaction index with regard to pairs between learning data and unsupervised data acquired in processing performed in step S301. In the first exemplary embodiment, since the estimated user satisfaction index is defined as a normalized histogram, the degree of similarity in estimated user satisfaction index is defined by an inter-histogram distance. FIG. 4B is a schematic diagram of calculation processing for the degree of similarity in estimated user satisfaction. FIG. 4B illustrates the manner of calculating the degree of similarity in estimated user satisfaction in each of all of the pairs between learning data and unsupervised data selected in processing performed in step S301. For example, according to an estimation result similarity matrix, the degree of similarity between a normalized histogram which is an estimation result of learning data Ln and a normalized histogram which is an estimation result of unsupervised data Am is calculated to be "0.63". Similarly, an estimation result (degree of similarity) between learning data L1 and unsupervised data A1 is "0.82". An estimation result (degree of similarity) between learning data. L1 and unsupervised data Am is "0.85". An estimation result (degree of similarity) between learning data L2 and unsupervised data A1 is "0.88".

In step S303, the similar-in-estimation-result unsupervised data search unit 140 associates each piece of unsupervised data with learning data having the highest degree of similarity in estimated user satisfaction index calculated in processing performed in step S302 (having the shortest inter-histogram distance). In the case of an example illustrated in FIG. 4B, unsupervised data A1 is allocated to learning data L2 highest in estimation result (degree of similarity), and unsupervised data Am is allocated to learning data L1. With regard to unsupervised data A2, since there is no learning data high in degree of similarity, no allocation is performed, so that unsupervised data A2 is not used as learning data. Moreover, at this time, as in processing performed in step S301, no allocation is also performed with regard to unsupervised data the estimation result similarity of which is less than the threshold value. For example, in a case where the threshold value is set to "0.90", no allocation is also performed with regard to a pair of learning data L1 and unsupervised data Am having the highest degree of similarity (degree of similarity being 0.85).

Processing in step S301 has the effect of increasing the accuracy of teacher information by extracting unsupervised data which is similar in data itself to learning data. For example, in similar data search using an estimation result in processing performed in step S302, there may be case where there is a plurality of pieces of learning data high in estimation result (degree of similarity) with respect to one piece of unsupervised data. In this case, depending on information to be estimated, if estimation results similarly resemble each other, selecting pieces of data which are also similar in feature thereof enables assigning teacher information having a smaller amount of error.

A user satisfaction to be estimated in the first exemplary embodiment is greatly affected by the appearance of an image, such as the location of a subject shown in an image, a subject itself, and coloring. Therefore, performing processing in steps S301 and S302, which searches for a learning image similar in appearance to an input unsupervised image and uses teacher information about the detected learning image, enables assigning better teacher information. On the other hand, in a case where the association between the degree of similarity of data itself and information to be estimated is low, processing in steps S301 and S302 can be omitted and searching for learning data similar in estimation result between all of the pieces of learning data and all of the pieces of unsupervised data can be performed.

Figure 5:
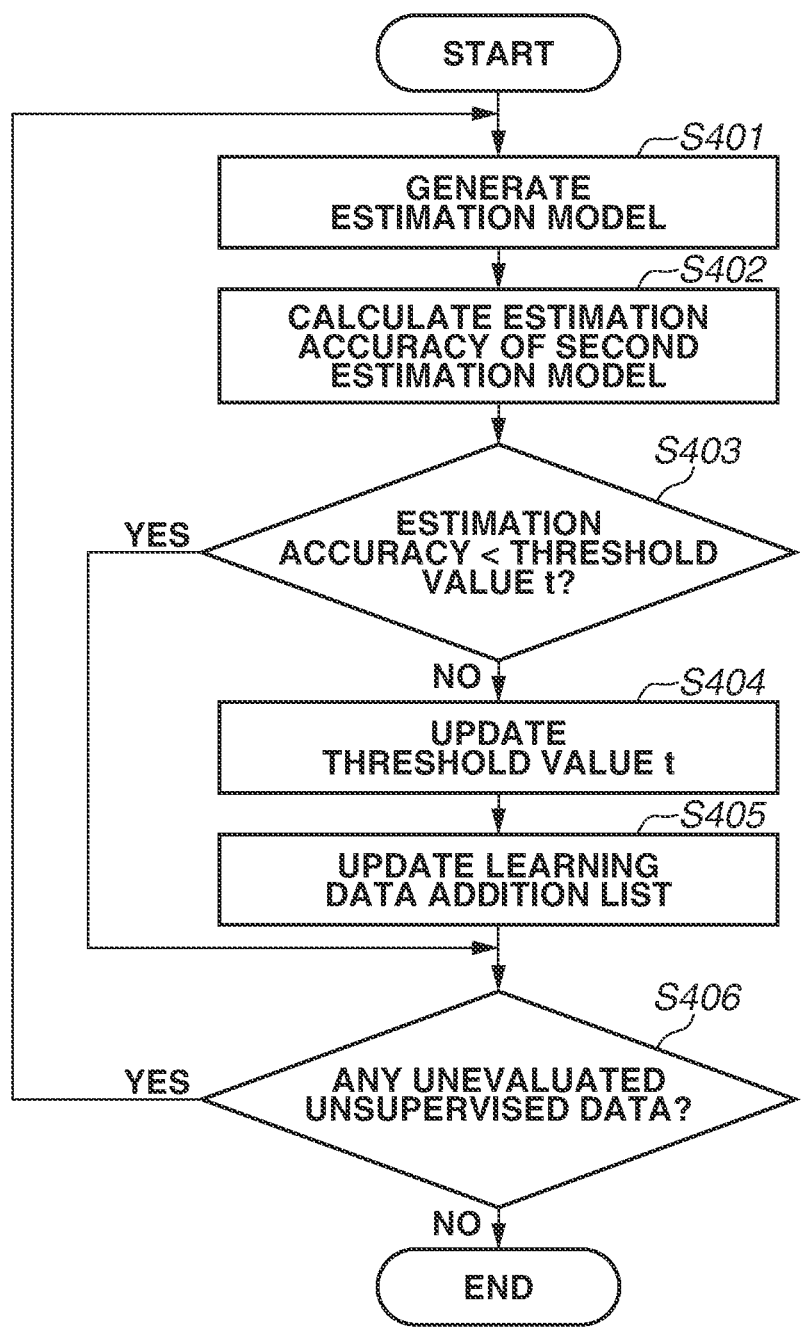
FIG. 5 is a flowchart illustrating verification processing for estimation accuracy.

FIG. 5 is a flowchart illustrating verification processing for estimation accuracy performed in step S208.

In step S401, the estimation accuracy verification unit 160 performs learning with use of a learning data set including unsupervised data, thus generating an estimation model. The estimation accuracy verification unit 160 selects unsupervised data in which teacher information is set in processing performed in steps S206 and S207, from among pieces of unsupervised data included in the unsupervised data set 400, The estimation accuracy verification unit 160 performs learning with use of the selected unsupervised data and the first learning data set 200, thus generating an estimation model.

In step S402, the estimation accuracy verification unit 160 calculates the estimation accuracy of the estimation model generated in processing performed in step S401 with use of the accuracy verification data set 700. The accuracy verification data set 700 is composed of a plurality of pieces of data having teacher information which is not included in the first learning data set 200. The estimation accuracy is calculated by performing estimation processing on N pieces of accuracy verification data included in the accuracy verification data set 700. Specifically, the estimation accuracy ac of an estimation model is expressed by the following formula.

$$ac = 1 - \frac{\sum_{i=1}^{N} D(h_{gt}(i), h_{est}(i))}{N}$$

$h_{gt}(i)$ is teacher information about data i, $h_{est}(i)$ is an estimation result of the data i, $D(h1, h2)$ is a function for calculating the distance between a histogram h1 and a histogram h2. In a case where the estimation result and the teacher information are consistent with each other in all of the pieces of accuracy verification data, the estimation accuracy ac is calculated to be "1.0".

In step S403, the estimation accuracy verification unit 160 checks whether the estimation accuracy of the estimation model generated in processing performed in step S401 is less than a threshold value t. The initial value of the threshold value t is, for example, the estimation accuracy of the first estimation model 300 relative to the accuracy verification data set 700. By performing this processing, in a case where the estimation accuracy is reduced by addition of unsupervised data, the estimation accuracy verification unit 160 is able to exclude the unsupervised data from learning.

If the estimation accuracy of the estimation model is equal to or greater than the threshold value t (NO in step S403), then in step S404, the estimation accuracy verification unit 160 updates the threshold value t to the estimation accuracy ac of the estimation model generated in processing performed in step S401. In step S405, to add unsupervised data which has been used for learning to learning data, the estimation accuracy verification unit 160 adds the unsupervised data to a learning data addition list. The learning data addition list is a list of pieces of unsupervised data to be newly added as learning data, and is an empty list in its initial state.

After updating of the learning data addition list or if the estimation accuracy of the estimation model is less than the threshold value t (YES in step S403), then in step S406, the estimation accuracy verification unit 160 checks whether there is any unevaluated unsupervised data. If teacher information is previously set and there is unsupervised data which is not yet subjected to processing in steps S401 to S405 (YES in step S406), the estimation accuracy verification unit 160 repeatedly performs processing in step S401 and subsequent steps. If verification has been completed with respect to all of the pieces of unsupervised data (NO in step S406), the estimation accuracy verification unit 160 ends the estimation accuracy verification processing.

The information processing apparatus 1000 according to the first exemplary embodiment described above automatically assigns teacher information to unsupervised data and uses the unsupervised data with the teacher information assigned thereto as learning data, thus being able to increase variations of learning data and learn a high-accuracy estimator. The information processing apparatus 1000 uses, as teacher information about unsupervised data, not an estimation result including an error but teacher information about learning data similar to unsupervised data, and is, therefore, able to perform learning with use of a value close to a true value which is obtained before an error caused by estimation processing is included. Therefore, a deterioration in learning performance which may be caused by unsupervised data being used for learning can be reduced.

In a second exemplary embodiment, a configuration for improving the generation accuracy of teacher information which is assigned to unsupervised data is described. In the first exemplary embodiment, as teacher information about unsupervised data, teacher information about learning data similar to the unsupervised data is used. However, unsupervised data is not necessarily completely consistent in estimation result with learning data. Therefore, there occurs an influence of an error caused by teacher information about similar learning data being directly used. In the case of estimating multivalued data such as a user satisfaction index in the first exemplary embodiment, assigning the same teacher information as that of existing learning data to unsupervised data causes the same teacher information to exist with respect to different pieces of learning data, so that there is a possibility of the overall estimation accuracy being decreased. Therefore, the information processing apparatus according to the second exemplary embodiment generates teacher information about unsupervised data based on a relationship between teacher information about learning data and an estimation result.

Figure 6A:
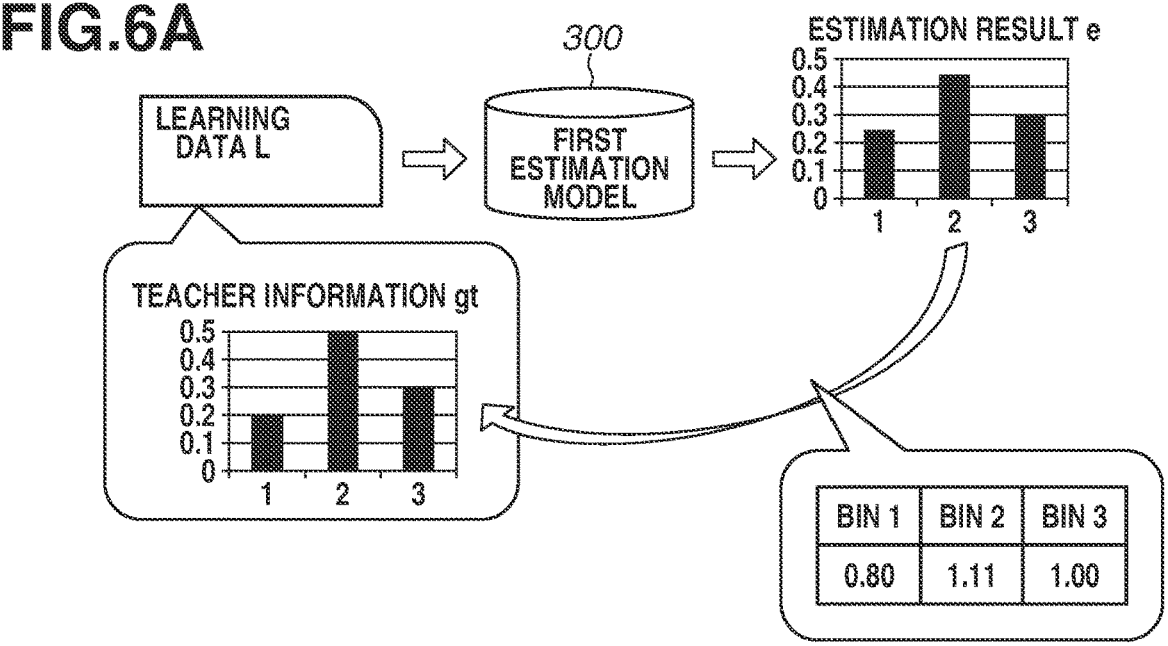
FIGS. 6A and 6B are explanatory diagrams of processing for generating teacher information about unsupervised data.
Figure 6B:
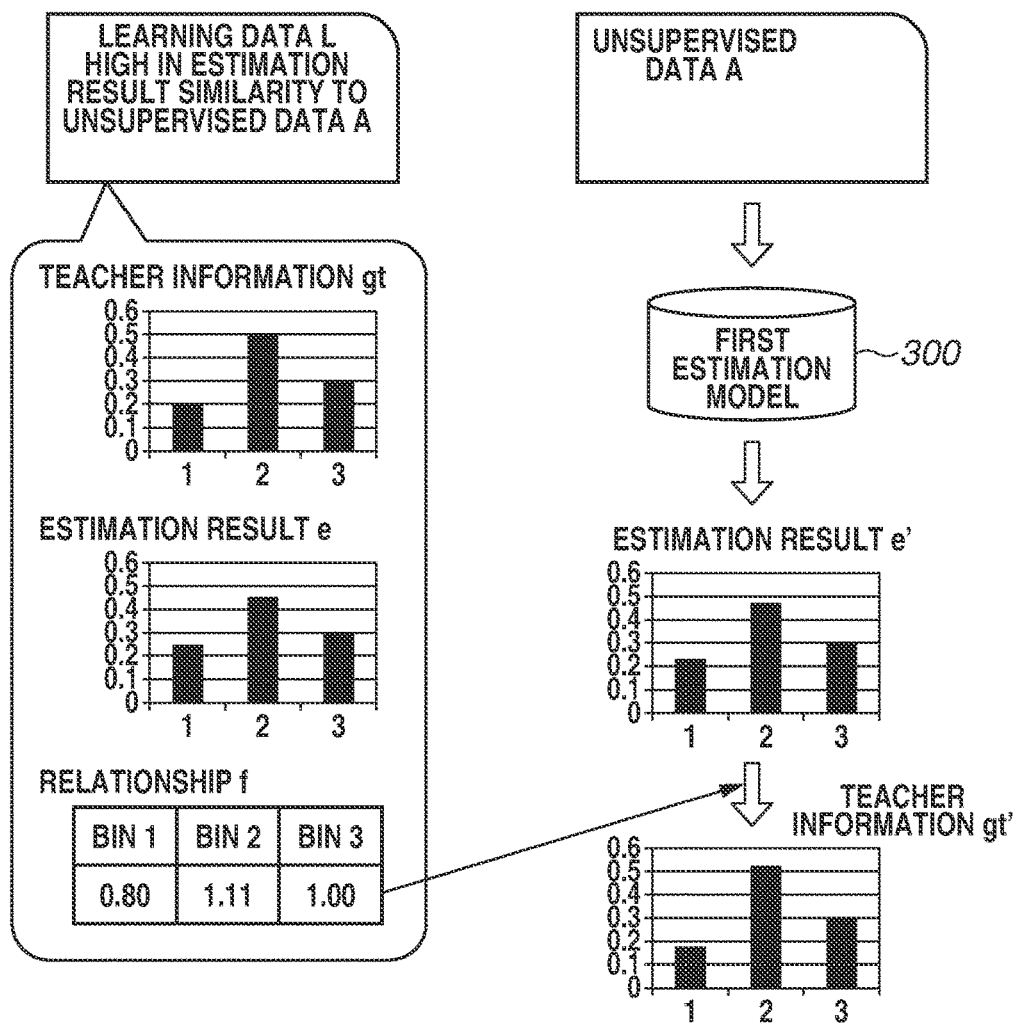

The configuration of the information processing apparatus according to the second exemplary embodiment is similar to that of the information processing apparatus 1000 in the first exemplary embodiment illustrated in FIG. 1, and is, therefore, omitted from description. The estimation model generation processing is roughly the same as that of the first exemplary embodiment illustrated in FIG. 2, but differs in details of processing in steps S202 and S207. This different processing is described. FIGS. 6A and 6B are explanatory diagrams of processing for generating teacher information about unsupervised data.

In processing performed in step S202, as in the first exemplary embodiment, the learning data estimation processing unit 120 performs estimation processing using the first estimation model 300 on learning data included in the first learning data set 200. At this time, the learning data estimation processing unit 120 in the second exemplary embodiment stores, in addition to an estimation result, a relationship between the estimation result and teacher information for every piece of learning data. The schematic diagram of FIG. 6A illustrates the manner of calculating an estimation result e by inputting learning data L to the first estimation model 300.

Here, to enable restoring teacher information gt which is previously included in the learning data L based on the estimation result e of the learning data L, the learning data estimation processing unit 120 stores a relationship between the estimation result e and the teacher information gt. For example, in a case where the form of information to be estimated is a normalized histogram with three bins, the learning data estimation processing unit 120 stores the ratio in every bin of the histogram between teacher information and an estimation result. In FIG. 6A, the teacher information gt about the learning data L is a histogram in which the frequency of bin 1 is "0.2", the frequency of bin 2 is "0.5", and the frequency of bin 3 is "0.3". The estimation result e is a histogram in which the frequency of bin 1 is "0.25", the frequency of bin 2 is "0.45", and the frequency of bin 3 is "0.3". The learning data estimation processing unit 120 stores, as a relationship f between the estimation result e and the teacher information gt, bin 1: 0.20/0.25=0.80, bin 2: 0.50/0.45==1.11, and bin 3: 0.30/0.30=1.00, which are conversion coefficients for the respective bins.

In processing performed in step S207, the teacher information setting unit 150 sets, based on the relationship f between an estimation result and teacher information stored in processing performed in step S202, teacher information about unsupervised data set in step S206 in learning data corresponding to the unsupervised data. The schematic diagram of FIG. 6B illustrates a manner in which learning data L high in estimation result similarity relative to unsupervised data A is set. The learning data L includes, as a result of processing in step S202, teacher information gt, an estimation result e, and a relationship f between the estimation result e and the teacher information gt. An estimation result e' is calculated from the unsupervised data A with use of the first estimation model 300. In processing performed in step S207, teacher information gt' is calculated from the estimation result e' according to the relationship f included in similar learning data.

In a case where the estimation result e' is a histogram in which the frequency of bin 1 is "0.22", the frequency of bin 2 is "0.47", and the frequency of bin 3 is "0.31", when the relationship f stored as conversion coefficients for the respective bins is applied to the estimation result e', the teacher information gt' becomes a histogram having the following frequencies of the respective bins. The frequency of bin 1 is 0.22×0.80=0.176. The frequency of bin 2 is 0.47×1.11=0.522. The frequency of bin 3 is 0.31× 1.00=0.310. Moreover, when the calculated histogram is normalized, the teacher information gt' becomes a histogram in which the frequency of bin 1 is "0.175", the frequency of bin 2 is "0.518", and the frequency of bin 3 is "0.307".

Furthermore, in a case where the relationship f is applied to the estimation result e', weighting of the conversion coefficients can be performed according to the degree of similarity between the estimation result e' about the unsupervised data A and the estimation result e about the learning data L or the degree of similarity in feature amount calculated in processing performed in step S206 (step S301 in FIG. 3). For example, in a case where the degree of similarity between the estimation result e' about the unsupervised data A and the estimation result e' about the learning data L is 0.9, weighting can be performed to the conversion coefficients for the respective bins with random numbers in the range of 0.9 to 1.1.

The information processing apparatus according to the second exemplary embodiment described above stores, in advance, a relationship between an estimation result and teacher information relative to learning data, and then calculates teacher information from an estimation result of unsupervised data based on the stored relationship. With this, the information processing apparatus is able to generate more high-accuracy teacher information about unsupervised data.

A third exemplary embodiment is directed to attaining weight saving of a dictionary size and speeding up of processing by performing clustering on learning data. With this, the information processing apparatus is enabled to shorten a processing time caused by an increase of learning data. Moreover, the information processing apparatus stores a relationship between an estimation result and teacher information for every piece of learning data and is, therefore, able to perform weight saving of a memory size required for processing which becomes enlarged due to an increase of learning data.

FIG. 7 is a diagram illustrating an example of a functional configuration of an information processing apparatus according to the third exemplary embodiment. The information processing apparatus 3000 has a configuration obtained by adding a learning data classification unit 330 to the configuration of the information processing apparatus 1000 in the first exemplary embodiment illustrated in FIG. 1. The learning data classification unit 330 performs classification of learning data based on an estimation result of each piece of learning data obtained by the learning data estimation processing unit 120.

Figure 8:
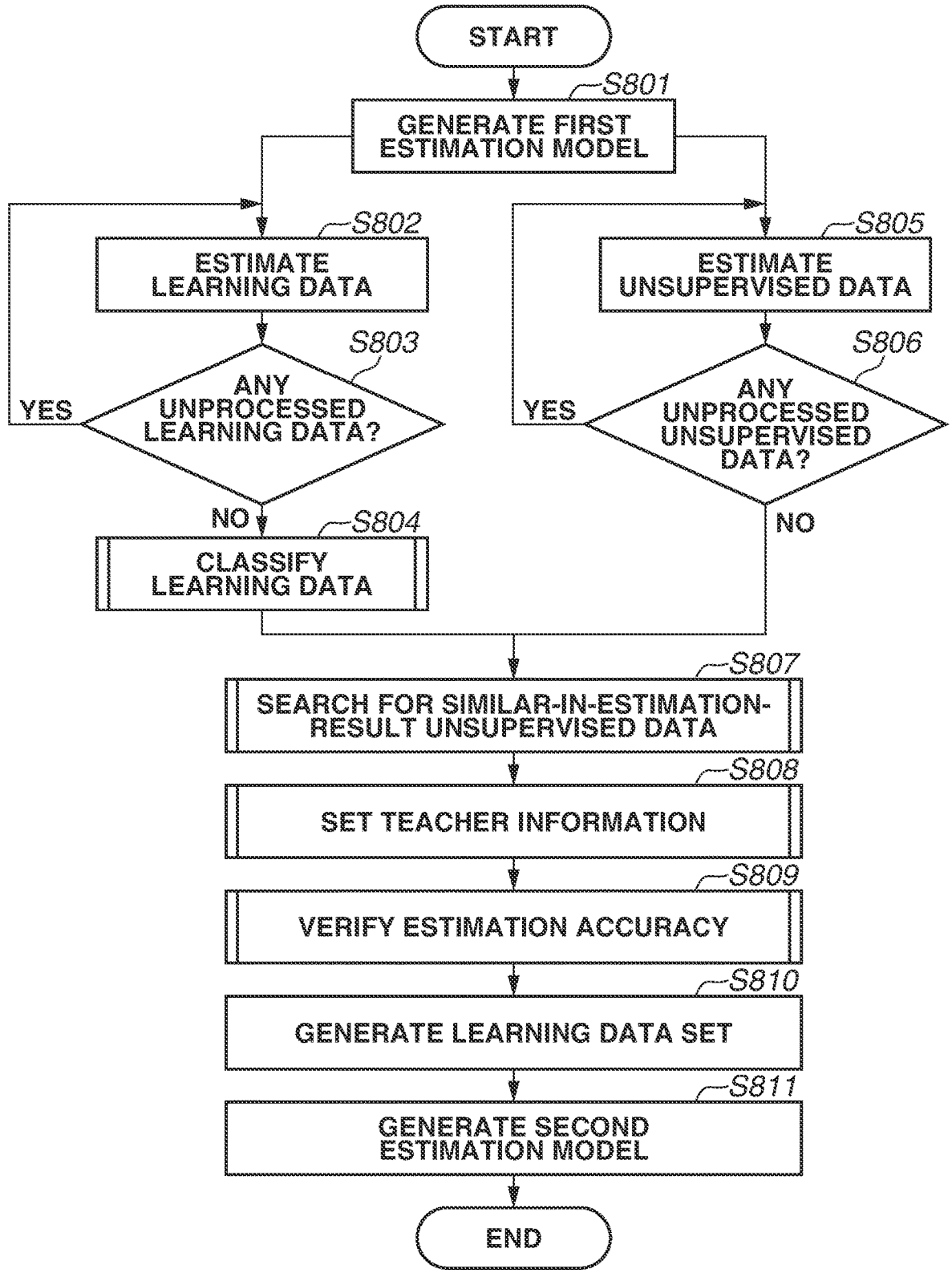
FIG. 8 is a flowchart illustrating estimation model generation processing.

FIG. 8 is a flowchart illustrating estimation model generation processing which is performed by the information processing apparatus 3000. In comparison with the estimation model generation processing in the first exemplary embodiment illustrated in FIG. 2, processing in steps S801 to S803 is similar to the processing in steps S201 to S203. Processing in steps S805 and S806 is similar to the processing in steps S204 and S205. Processing in steps S808 to S811 is similar to the processing in steps S207 to S210. These similar processing operations are omitted from description.

Figure 9:
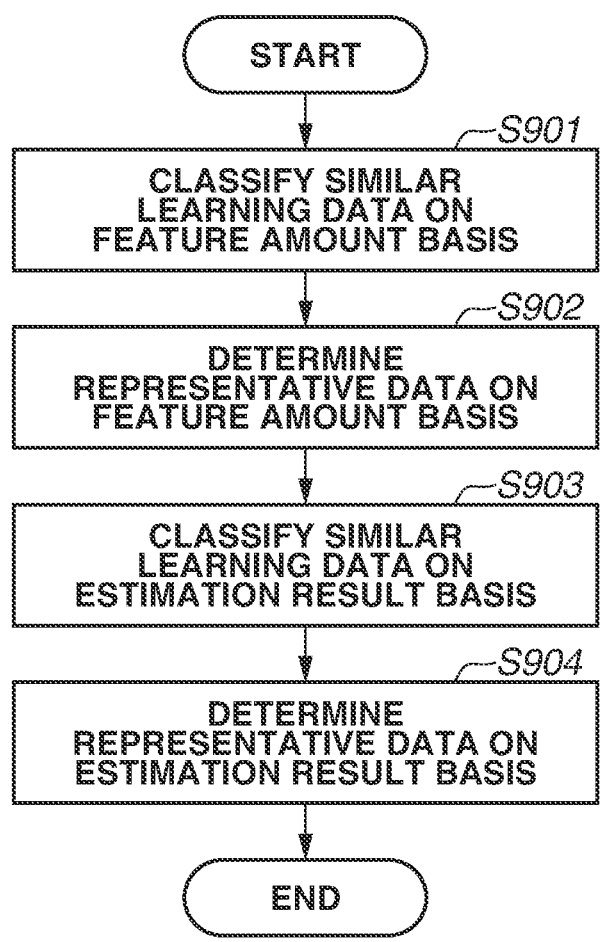
FIG. 9 is a flowchart illustrating learning data classification processing.

According to processing in steps S802 and S803, an estimation result and a relationship between an estimation result and teacher information are stored with respect to all of the pieces of learning data included in the first learning data set 200. In step S804, the learning data classification unit 330 performs learning data classification processing. FIG. 9 is a flowchart illustrating learning data classification processing.

In step S901, the learning data classification unit 330 classifies learning data into a plurality of clusters on a feature amount basis. The feature amount for use in classification is a predetermined feature amount expressing the degree of similarity of the feature itself of data, as with the feature amount used in processing performed in step S301 in the first exemplary embodiment (see FIG. 3). The learning data classification unit 330 performs classification processing using a known method. For example, the learning data classification unit 330 previously sets the number of clusters into which classification is performed, and classifies pieces of learning data with use of K-means clustering. Instead of simply comparing the degrees of similarity of the extracted feature amounts, the learning data classification unit 330 can perform classification with use of a dictionary which has previously been learned by an existing machine learning method. For example, the learning data classification unit 330 can classify learning images with use of a dictionary used to perform scene category classification of images. According to processing in step S901, pieces of learning data included in the first learning data set 200 are classified into a plurality of clusters corresponding to the degrees of similarity in feature of data.

In step S902, the learning data classification unit 330 determines a representative feature amount for every cluster into which classification has been performed in processing performed in step S901. The learning data classification unit 330 calculates the average of feature amounts of pieces of learning data included in each cluster, and sets the calculated average feature amount as a representative feature amount. Alternatively, the learning data classification unit 330 can set the feature amount of learning data having the highest degree of similarity to the average feature amount as a representative feature amount.

In step S903, the learning data classification unit 330 classifies learning data into a plurality of clusters on an estimation result basis. According to processing in steps S802 and S803, an estimation result is included in each of all of the pieces of learning data included in the first learning data set 200. For every cluster into which classification has been performed in processing performed in step S901, pieces of learning data are further classified into a plurality of clusters according to the degrees of similarity in estimation result.

In step S904, the learning data classification unit 330 determines representative data for every cluster into which classification has been performed in processing performed in step S903. The learning data classification unit 330 sets one piece of learning data selected from all of the pieces of learning data included in each cluster as representative data. A predetermined method is used for selection of learning data. For example, the learning data classification unit 330 calculates the average of estimation results of pieces of learning data included in each cluster, and sets learning data closest to the calculated average value as representative data.

According to processing in step S904, one piece of learning data is selected as representative data for every cluster.

According to the learning data classification processing described above, all of the pieces of learning data included in the first learning data set 200 are classified into a plurality of clusters high in degree of similarity on a feature amount basis and an estimation result basis. Then, representative data retaining teacher information, an estimation result, and a relationship between an estimation result and teacher information is set for every cluster. Learning data which has not been selected as representative data does not need to contain an estimation result and a relationship between an estimation result and teacher information. Therefore, in comparison with the first exemplary embodiment and the second exemplary embodiment, the information processing apparatus 3000 according to the third exemplary embodiment is enabled to reduce a memory size required for processing.

After the learning data classification processing is completed and in a case where an estimated user satisfaction index has been calculated with respect to all of the pieces of unsupervised data (NO in step S806), the information processing apparatus 3000 proceeds to next processing. In step S807, the similar-in-estimation-result unsupervised data search unit 140 searches for unsupervised data similar to learning data, and sets a pair of learning data and unsupervised data high in degree of similarity. This processing is similar to the processing illustrated in FIG. 3 in the first exemplary embodiment, but, in the third exemplary embodiment, in similar learning data search processing, the similar-in-estimation-result unsupervised data search unit 140 performs searching only on representative data selected in processing performed in step S804. Processing in step S807 is described in detail with reference to the flowchart of FIG. 3 again.

In step S301, the similar-in-estimation-result unsupervised data search unit 140 searches for a cluster similar to unsupervised data from a plurality of clusters into which learning data has been classified on a feature amount basis in processing performed in step S901. Searching is performed by comparing a representative feature amount set for each cluster and a feature amount extracted from unsupervised data with each other. Unsupervised data and a feature amount basis cluster having a degree of similarity equal to or greater than a threshold value are set as a pair. Furthermore, as in the first exemplary embodiment, the similar-in-estimation-result unsupervised data search unit 110 can omit this processing and can perform selection of similar learning data only on an estimation result basis. In that case, feature amount basis similar learning data classification processing for learning data in processing performed in steps S901 and S902 can be omitted.

In step S302, the similar-in-estimation-result unsupervised data search unit 140 calculates an estimation result similarity between unsupervised data set in processing performed in step S301 and representative data of all of the clusters classified on an estimation result basis included in a cluster to which the unsupervised data has been allocated. In step S303, the similar-in-estimation-result unsupervised data search unit 140 associates representative data highest in estimation result similarity calculated in processing performed in step S302 with unsupervised data. In comparison with the corresponding processing in the first exemplary embodiment (processing in step S206 illustrated in FIG. 2), the above processing in step S807 attains high-speed selection of similar learning data.

The information processing apparatus 3000 according to the third exemplary embodiment described above performs clustering of learning data on a feature amount basis and an estimation result basis, thus being able to attain weight saving of a dictionary size and speeding up of processing time.

In a fourth exemplary embodiment, a method of automatically selecting, from a large number of images owned by the user, an image set high in user satisfaction and presenting the selected image set to the user is described. The user satisfaction in the fourth exemplary embodiment is an index concerning whether a photograph is good or bad. Whether the user thinks that a photograph is good is different with each user. Therefore, an information processing apparatus according to the fourth exemplary embodiment is required to perform learning in consideration of not only generalized teacher information but also liking of an individual user.

As a conventional method of extracting an image set high in user satisfaction, there is a method of performing learning with use of a learning image set in which a satisfaction evaluation distribution obtained by evaluation by a plurality of general users is included in teacher information (evaluation information) and evaluating a user's image set with use of the generated estimation model. However, in this method, in a case where images different in theme or category from photographs owned by the user are included in a previously-prepared learning image set, there is a possibility of selection high in user satisfaction not being performed with a high degree of accuracy.

For example, in a case where learning is performed with use of a learning data set including a large number of still life photographs or landscape photographs with respect to a user who likes photographing of portrait photographs, information specific to still life photographs or landscape photographs which are not included in an image set owned by the user is learned. As a result, an estimation accuracy in selection of portrait photographs which the user likes may be decreased. In this case, collecting only a great number of portrait photographs as a learning image set to perform learning enables performing better learning. However, it is not easy to previously prepare a great number of learning images with teacher information made consistent with an image set owned by the user.

To reflect liking of an individual in learning, there is a method of allowing the user to previously evaluate the degree of satisfaction of photographs owned by the user as learning data and using such an image set for learning. However, a large amount of data is required for learning, and it is not realistic for the user to prepare and evaluate such a large amount of data.

Figure 10:
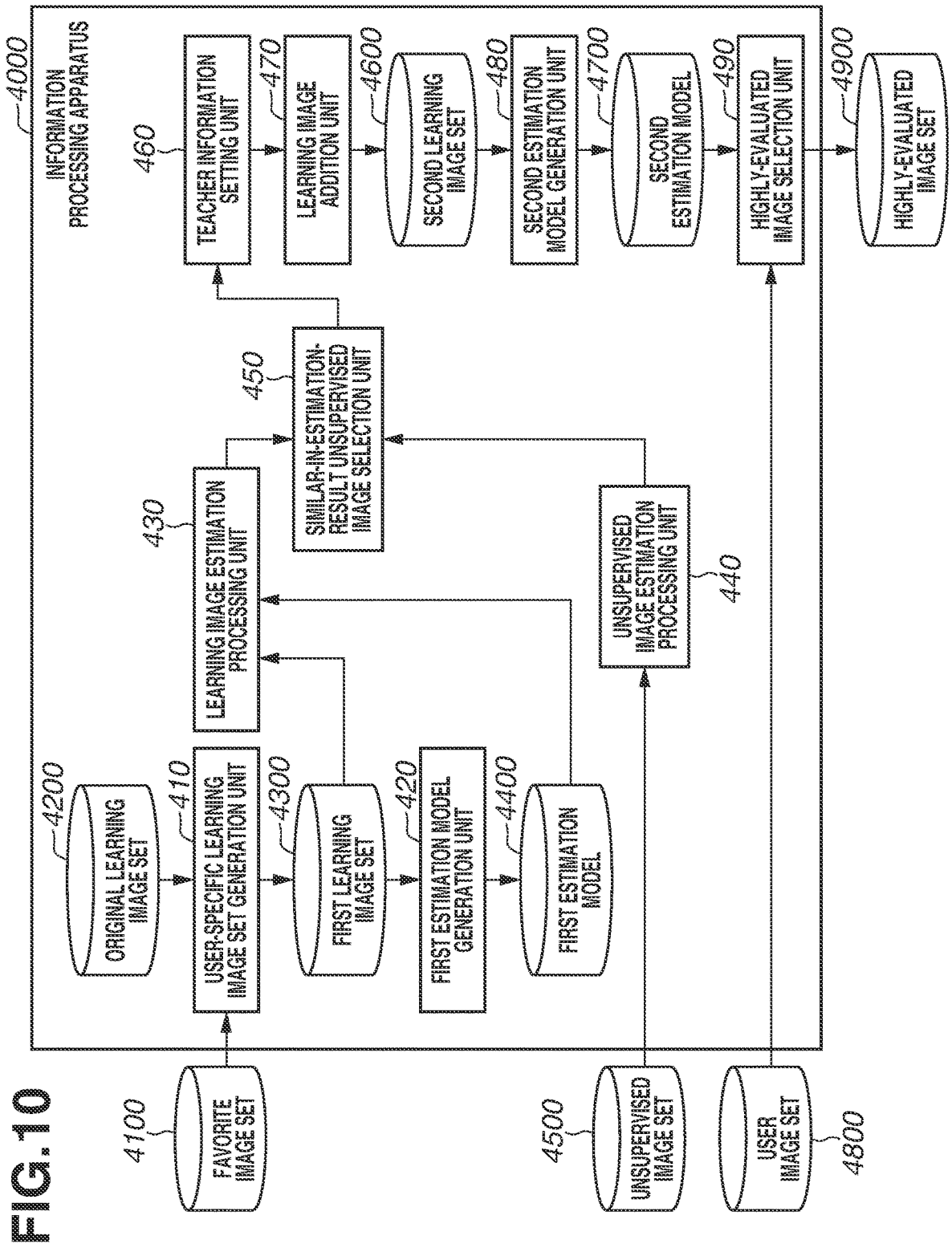
FIG. 10 is a diagram illustrating an example of a functional configuration of an information processing apparatus.

In the fourth exemplary embodiment, learning corresponding to an image set owned by the user is performed with use of unsupervised images, so that image selection high in user satisfaction is performed with a high degree of accuracy. FIG. 10 is a diagram illustrating an example of a functional configuration of the information processing apparatus according to the fourth exemplary embodiment.

The information processing apparatus 4000 functions as a user-specific learning image set generation unit 410, a first estimation model generation unit 420, a learning image estimation processing unit 430, an unsupervised image estimation processing unit 440, and a similar-in-estimation-result unsupervised image selection unit 450. Moreover, the information processing apparatus 4000 functions as a teacher information setting unit 460, a learning image addition unit 470, a second estimation model generation unit 480, and a highly-evaluated image selection unit 490. Furthermore, the information processing apparatus 4000 includes an original learning image set 4200, which is composed of a plurality of learning images having teacher information. The original learning image set 4200 is stored in a predetermined storage. To the information processing apparatus 4000 configured described above, a storage storing a favorite image set 4100, which is composed of a plurality of images high in degree of satisfaction previously selected from a plurality of existing images owned by the user, an unsupervised image set 4500, and a user image set 4800 is connected. Such image sets can be stored in different storages. The information processing apparatus 4000 outputs a highly-evaluated image set 4900 as a processing result.

The user-specific learning image set generation unit 410 searches for a plurality of images similar in theme category to the favorite image set 4100 from among the previously-prepared original learning image set 4200 having teacher information. The user-specific learning image set generation unit 410 sets the detected plurality of learning images as a first learning image set 4300. The user-specific learning image set generation unit 410 is equivalent to a user-specific learning data set generation unit.

The first estimation model generation unit 420 performs learning with use of the first learning image set 4300, thus generating a first estimation model 4400. The first learning image set 4300 is composed of images included in the original learning image set 4200. Therefore, each learning image is previously actually evaluated by a plurality of evaluating persons with respect to a degree of satisfaction of the learning image in multiple stages, and has, as teacher information, a normalized histogram which is a distribution of evaluation results by the plurality of evaluating persons. The first estimation model 4400 receives an image as an input and is able to output, as an estimation result, a normalized histogram which is a user satisfaction index.

The learning image estimation processing unit 430 performs estimation processing on all of the images included in the first learning image set 4300 with use of the first estimation model 4400, and stores the output user satisfaction index in association with every learning image.

The unsupervised image estimation processing unit 440 receives, as inputs, all of the images included in the unsupervised image set 4500, which is composed of a plurality of unsupervised images, and performs estimation processing on the received images with use of the first estimation model 4400. The unsupervised image estimation processing unit 440 outputs, as a result of estimation processing, an estimated user satisfaction index of each unsupervised image.

The similar-in-estimation-result unsupervised image selection unit 450 selects unsupervised images in which the degree of similarity thereof in estimation result to learning images included in the first learning image set 4300 is equal to or greater than a threshold value, from among unsupervised images included in the unsupervised image set 4500.

The teacher information setting unit 460 updates an estimated user satisfaction index of each unsupervised image based on a relationship between teacher information and an estimated user satisfaction index in a learning image highest in the degree of similarity in estimation result to each unsupervised image selected by the similar-in-estimation-result unsupervised image selection unit 450.

The learning image addition unit 470 regards the estimated user satisfaction index updated by the teacher information setting unit 460 as teacher information about each unsupervised image, and stores the teacher information in a second learning image set 4600.

The second estimation model generation unit 480 performs learning with use of the second learning image set 4600. The second estimation model generation unit 480 generates a second estimation model 4700 as a result of learning.

The highly-evaluated image selection unit 490 evaluates the user image set 4800 in which photographs taken by the user are included, with use of the second estimation model 4700 generated by the second estimation model generation unit 480. The highly-evaluated image selection unit 490 outputs, as an evaluation result, photographs high in estimated user satisfaction as the highly-evaluated image set 4900. The user image set 4800 includes a plurality of pieces of unknown image data.

Figure 11:
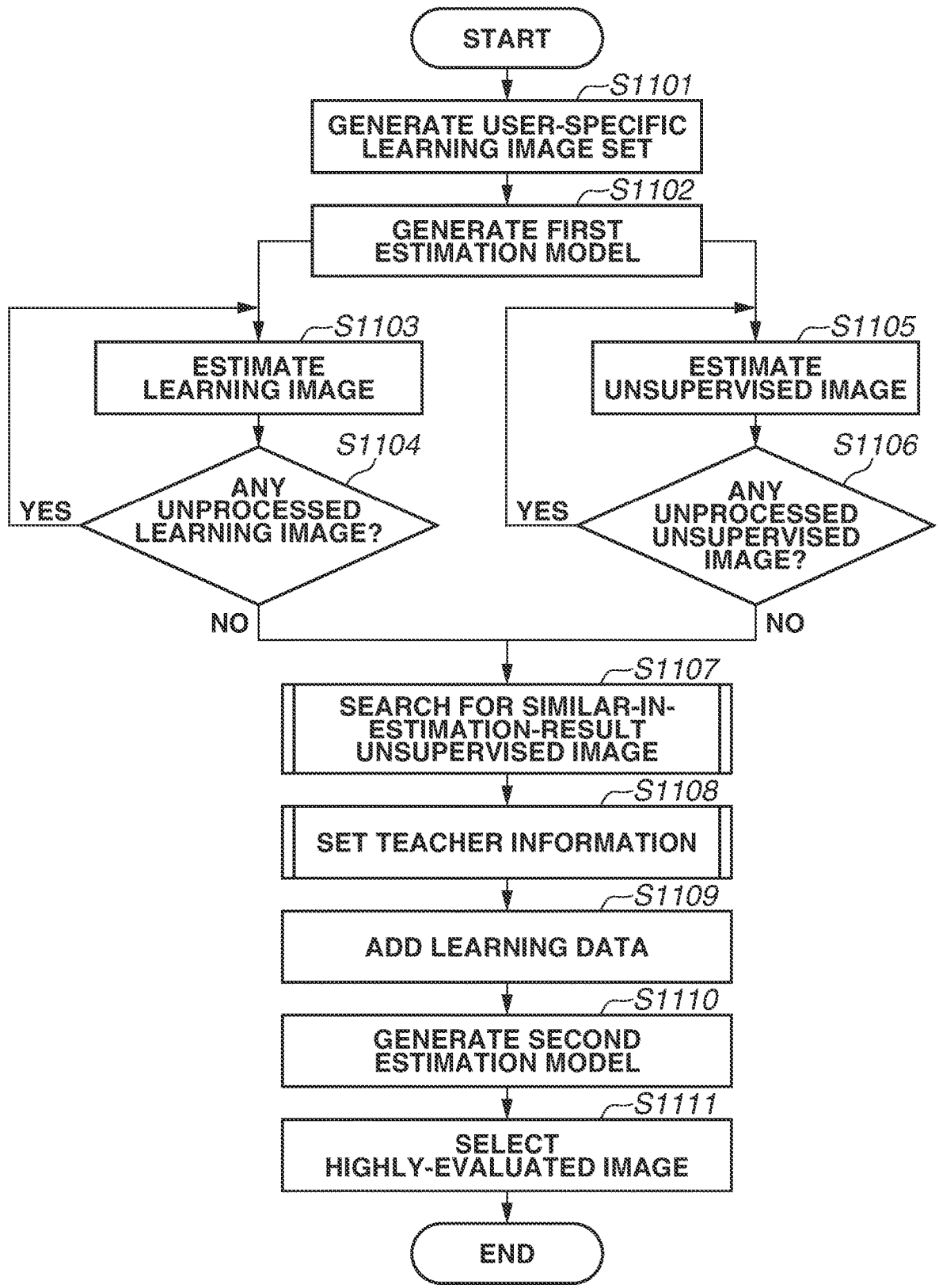
FIG. 11 is a flowchart illustrating estimation model generation processing.

FIG. 11 is a flowchart illustrating estimation model generation processing performed by the information processing apparatus 4000 configured as described above. FIG. 12 to FIG. 14 are explanatory diagrams of the estimation model generation processing.

Figure 12A:
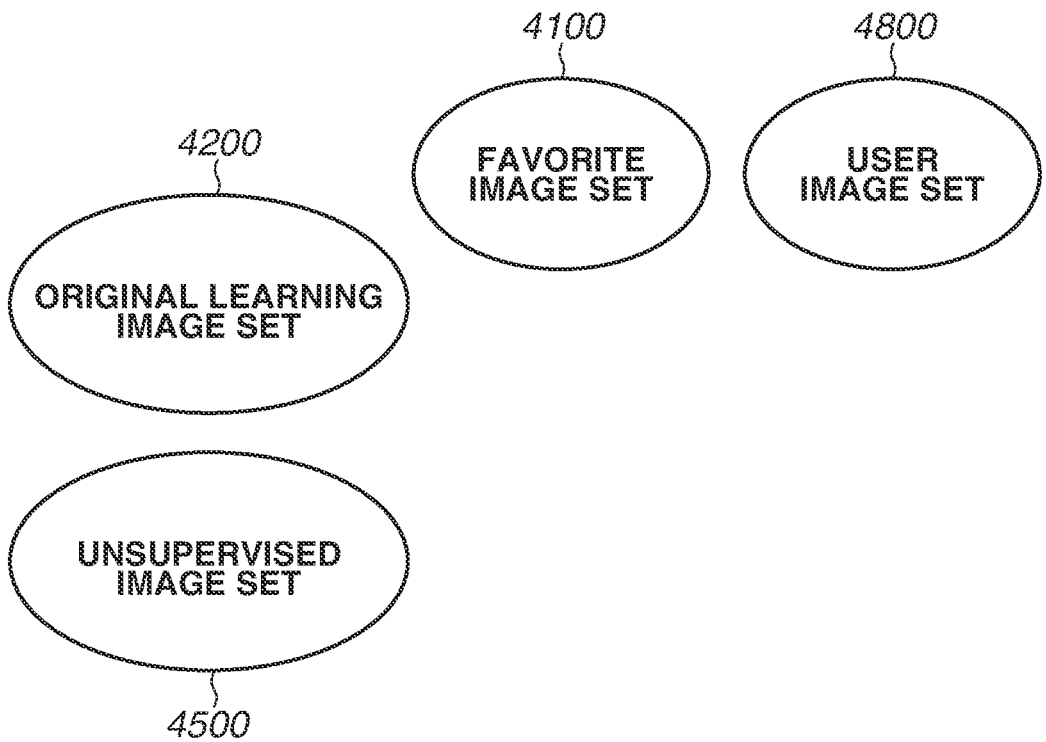
FIGS. 12A and 12B are explanatory diagrams of estimation model generation processing.
Figure 12B:
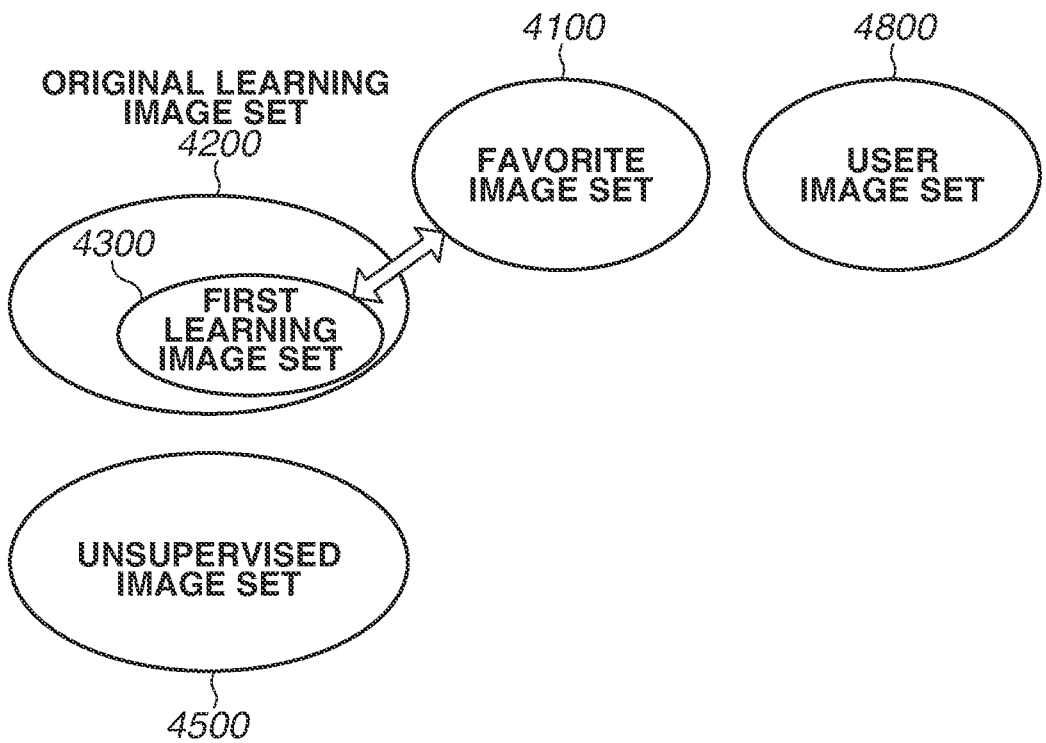

In an initial state, as illustrated in FIG. 12A the original learning image set 4200, the unsupervised image set 4500, the favorite image set 4100, which is an image set previously owned by the user, and the user image set 4800, which is not yet evaluated, exist. The favorite image set 4100 includes image data about a plurality of images (an image data group) owned by the user. The original learning image set 4200 is composed of a plurality of previously-prepared learning images having teacher information. The unsupervised image set 4500 is composed of a plurality of previously-prepared unsupervised images having no teacher information.

The favorite image set 4100 is composed of a plurality of images having no teacher information high in user satisfaction. The favorite image set 4100 can be generated by the user actually selecting images high in degree of satisfaction from among a plurality of images. Alternatively, the favorite image set 4100 can be generated from an image set owned by the user, based on meta information, such as the number of times an image was used for a photo album generated in the past or the number of times an image was viewed. The user image set 4800 is composed of a plurality of images which is not yet evaluated by the user. The information processing apparatus 4000 according to the fourth exemplary embodiment estimates images high in user satisfaction from among the user image set 4800 serving as input data, and presents the estimated images to the user.

Figure 13A:
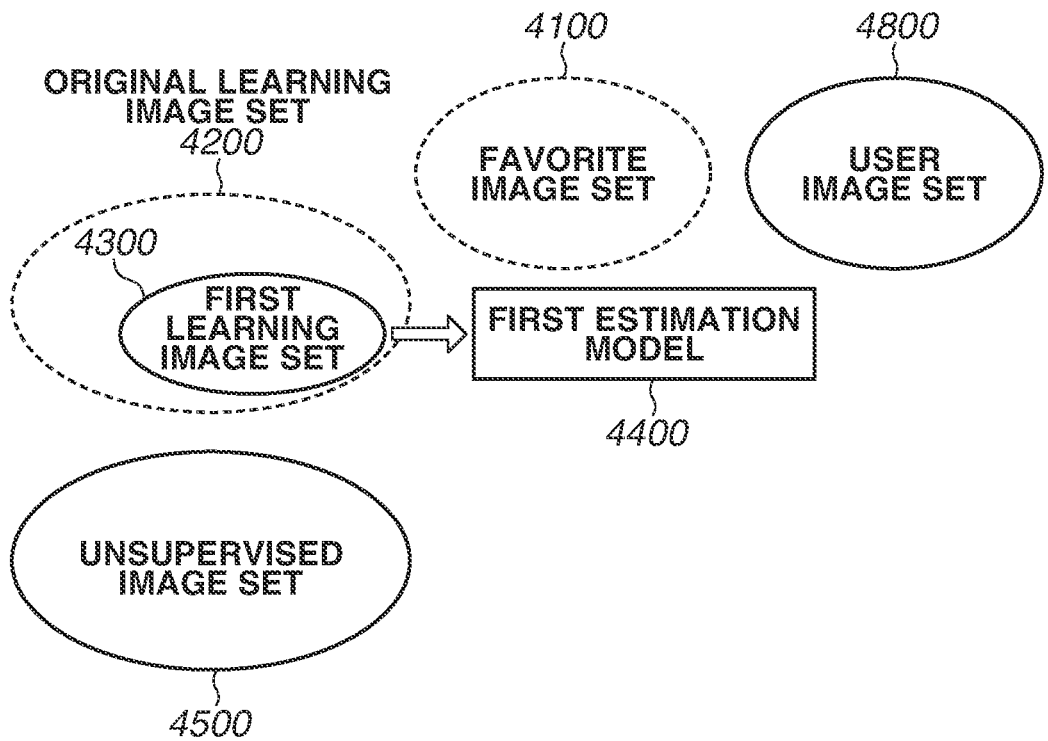
FIGS. 13A and 13B are explanatory diagrams of estimation model generation processing.

In step S1101, the user-specific learning image set generation unit 410 extracts learning images suitable for evaluation of the user image set 4800 serving as an evaluation target, from among the original learning image set 4200. At this time, to understand the tendency of liking of the user, the user-specific learning image set generation unit 410 uses the favorite image set 4100, which was previously generated by the user. The user-specific learning image set generation unit 410 extracts, as a user-specific learning image set, learning images similar in image scene category to images included in the favorite image set 4100, from the original learning image set 4200. Classification in scene category of images can be performed by using a known method through the use of a machine learning method. With this processing, as illustrated, for example, in FIG. 12B, a plurality of learning images similar in scene category to images included in the favorite image set 4100 is selected as the first learning image set 4300. In step S1102, as illustrated in FIG. 13A, the first estimation model generation unit 420 generates the first estimation model 4400 with use of the first learning image set 4300 generated in processing performed in step S1101.

In step S1103, the learning image estimation processing unit 430 performs estimation processing on learning images included in the first learning image set 4300 with use of the first estimation model 4400. The learning image estimation processing unit 430 stores the estimated user satisfaction index for every selected learning image. Moreover, the learning image estimation processing unit 430 stores a relationship between teacher information and an estimation result as in the second exemplary embodiment. In step S1104, the learning image estimation processing unit 430 searches for a learning image including no user satisfaction index from learning images included in the first learning image set 4300. If a learning image including no user satisfaction index has been detected (YES in step S1104), the processing returns to step S1103, in which the learning image estimation processing unit 430 performs estimation processing on the learning image. According to processing in steps S1103 and S1104, the learning image estimation processing unit 430 calculates a user satisfaction index with respect to each of all of the learning images included in the first learning image set 4300. The learning image estimation processing unit 430 causes a user satisfaction index, which is a distribution of evaluation results obtained by a plurality of evaluating persons, and an estimated user satisfaction index, which has been obtained by evaluation using the first estimation model 4400, to be included in each of all of the learning images included in the first learning image set 4300.

In step S1105, the unsupervised image estimation processing unit 440 performs estimation processing on arbitrary unsupervised images included in the unsupervised image set 4500, which is composed of a plurality of previously-prepared images with no teacher information assigned thereto, with use of the first estimation model 4400. The unsupervised image estimation processing unit 440 stores the estimated user satisfaction index for every selected unsupervised image. This processing is performed in parallel with processing performed by the learning image estimation processing unit 430. In step S1106, the unsupervised image estimation processing unit 440 searches for an unsupervised image in which no user satisfaction index is included from unsupervised images included in the unsupervised image set 4500. If an unsupervised image in which no user satisfaction index is included has been detected (YES in step S1106), the processing returns to step S1105, in which the unsupervised image estimation processing unit 440 performs estimation processing on the unsupervised image. According to processing in steps S1105 and S1106, the unsupervised image estimation processing unit 440 calculates a user satisfaction index with respect to each of all of the unsupervised images. The unsupervised image estimation processing unit 440 causes the estimated user satisfaction index obtained by estimation using the first estimation model 4400 to be included in each of all of the unsupervised images included in the unsupervised image set 4500.

Figure 13B:
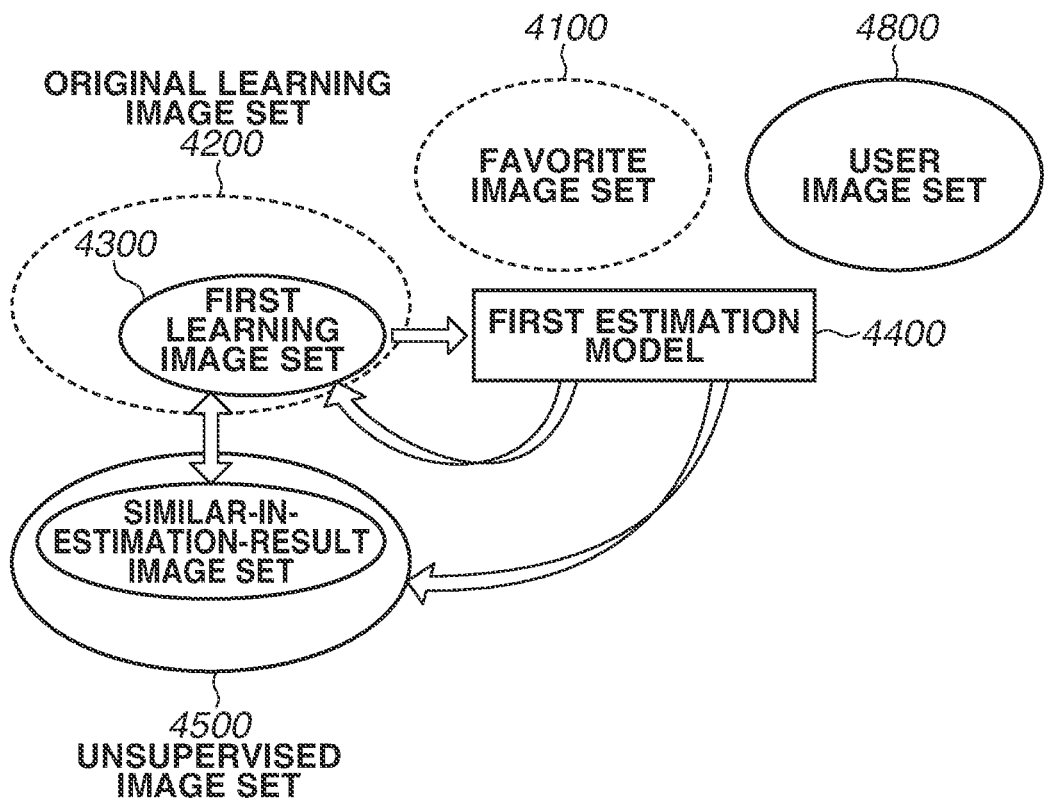

If the user satisfaction index has been calculated with respect to each of all of the learning images (NO in step S1104) and the estimated user satisfaction index has been calculated with respect to each of all of the unsupervised images (NO in step S1106), the information processing apparatus 4000 proceeds to next processing. In step S1107, the similar-in-estimation-result unsupervised image selection unit 450 selects an unsupervised image similar in estimation result to a learning image. This processing is similar to the processing in step S206 in the first exemplary embodiment, and is, therefore, omitted from description. However, in the fourth exemplary embodiment, with respect to an unsupervised image set as a pair with a learning image, in other words, an unsupervised image to be newly added to a learning image set, the similar-in-estimation-result unsupervised image selection unit 450 also calculates the degree of similarity to all of the images included in the favorite image set 4100. As illustrated in FIG. 13B, according to processing in steps S1103 to S1107, estimation processing is performed on the first learning image set 4300 and the unsupervised image set 4500 with use of the first estimation model 4400. With this, an image set similar in estimation result to the first learning image set 4300 is selected from the unsupervised image set 4500.

In step S1108, the teacher information setting unit 460 sets teacher information about an unsupervised image based on the estimation result of a learning image allocated to the unsupervised image in step S1107. Details of this processing are similar to those of the processing in step S207 in the second exemplary embodiment, and are, therefore, omitted from description. However, in the fourth exemplary embodiment, the teacher information setting unit 460 performs weighting in calculating teacher information with respect to an unsupervised image in which the degree of similarity thereof to images included in the favorite image set 4100 is equal to or greater than a threshold value, thus performing conversion in such a manner that the user satisfaction index becomes high.

Optional setting to weighting can be performed according to an estimation target. The teacher information setting unit 460 sets weighting in such a manner that the user satisfaction becomes higher than in a case where conversion is performed with use of a relationship between teacher information and an estimation result in learning data. For example, in a case where the user satisfaction index is output as a histogram with three bins, the teacher information setting unit 460 re-sets the conversion coefficient of bin 1 (low evaluation) to 90% of the original proportion and re-sets the conversion coefficient of bin 3 (high evaluation) to 110% of the original proportion.

Weighting is specifically described with reference to FIG. 6B again. In a case where, in FIG. 6B, the degree of similarity between unsupervised data A and an image included in the favorite image set 4100 is equal to or greater than a threshold value, the conversion coefficient of bin 1 is changed to "0.72", which is 90% of the original proportion, and the conversion coefficient of bin 3 is changed to "1.10", which is 110% of the original proportion. With regard to the estimation result e', the frequency of bin 1 is "0.22", the frequency of bin 2 is "0.47", and the frequency of bin 3 is "0.31". With the conversion coefficients changed, the estimation result e' becomes a histogram in which the frequency of bin 1 is 0.22×0.72=0.158, the frequency of bin 2 is 0.47×1.11=0.522, and the frequency of bin 3 is 0.31× 1.10=0.341. Moreover, normalization processing is performed, so that, in the histogram of teacher information subjected to weighting, the frequency of bin 1 becomes "0.155", the frequency of bin 2 becomes "0.511", and the frequency of bin 3 becomes "0.334". The user satisfaction becomes "2.18" as expressed by the average value of the histogram. The teacher information gt' illustrated in FIG. 6B is a histogram in which the frequency of bin 1 is "0.175", the frequency of bin 2 is "0.518", and the frequency of bin 3 is "0.307", and the average value is "2.13".

Performing weighting in this way enables setting high the user satisfaction of an unsupervised image close to an image the user likes personally. According to this processing, in a case where there is an unsupervised image resembling an image high in user satisfaction, a user satisfaction index higher than that of the calculated teacher information can be set to teacher information based on a relationship between teacher information and an estimation result in learning data. Therefore, selection more suitable for liking of the user becomes possible.

Figure 14A:
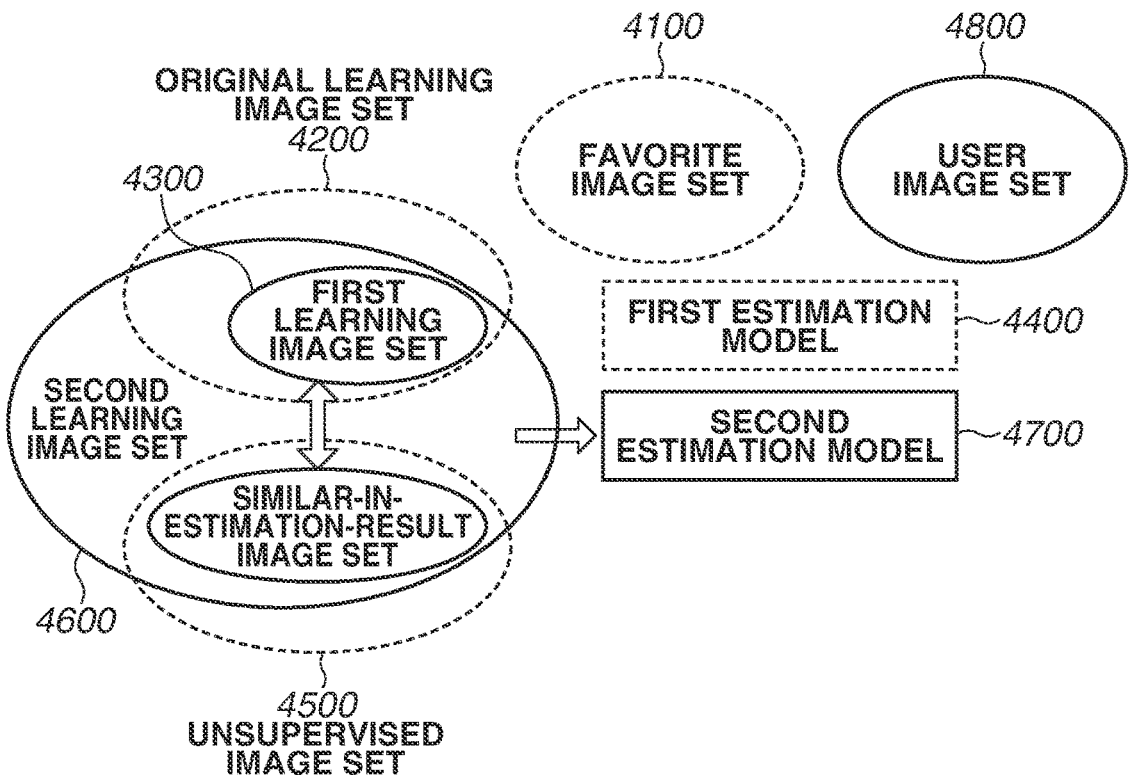
FIGS. 14A and 14B are explanatory diagrams of estimation model generation processing.

In step S1109, the learning image addition unit 470 adds together the unsupervised images with teacher information set thereto in processing performed in step S1108 and all of the images included in the first learning image set 4300 generated in processing performed in step S1101, thus generating the second learning image set 4600. In step S1110, the second estimation model generation unit 480 performs learning with use of the second learning image set 4600, thus generating the second estimation model 4700. As illustrated in FIG. 14A, according to processing in steps S1109 and S1110, the second estimation model 4700 is generated from the first learning image set 4300 and an image set included in the unsupervised image set 4500 and similar in estimation result to the first learning image set 4300.

Figure 14B:
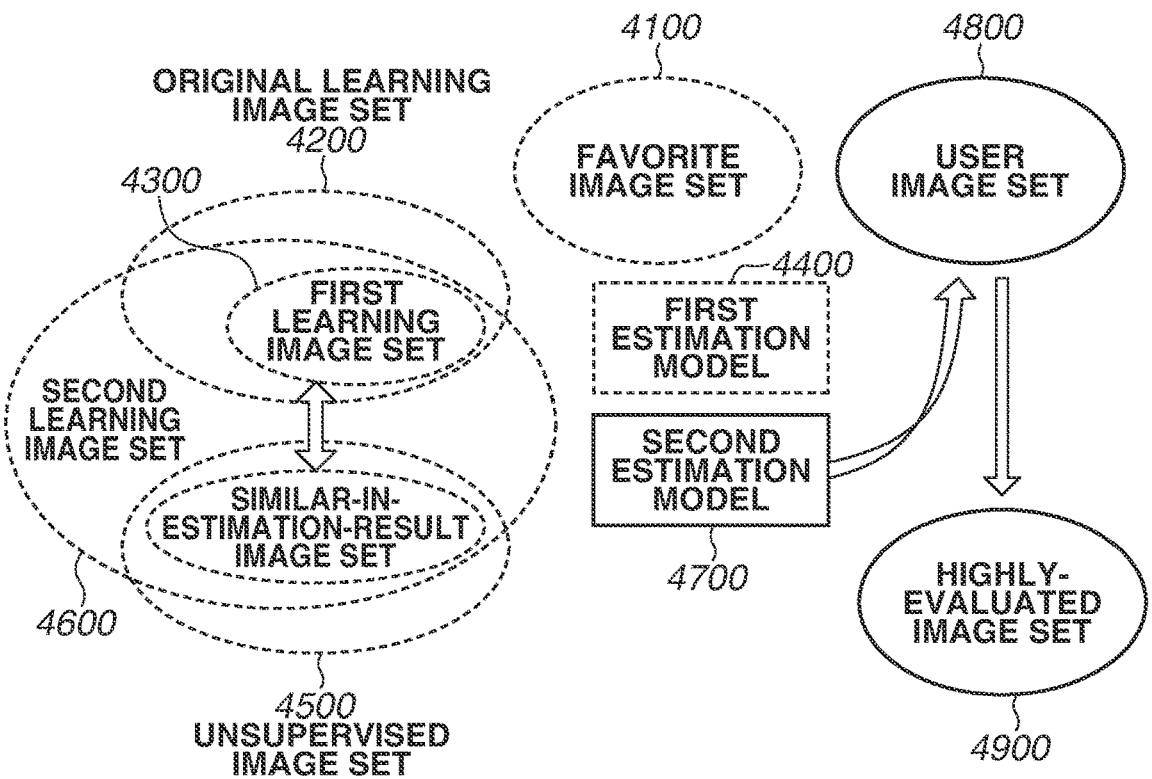

In step S1111, as illustrated in FIG. 14B, the highly-evaluated image selection unit (presentation unit) 490 performs estimation processing on all of the unknown images included in the user image set 4800 serving as an estimation target with use of the second estimation model 4700, thus calculating an estimated user satisfaction index. The highly-evaluated image selection unit 490 presents images high in estimated user satisfaction index as the highly-evaluated image set 4900 to the user as an output result. The number of images which are selected as the highly-evaluated image set 4900 serving as an output result can be a given number of images previously set in descending order of user satisfaction or can be the number of all of the images in which the user satisfaction thereof is equal to or greater than a threshold value.

The information processing apparatus 4000 according to the fourth exemplary embodiment described above generates, for every user, a learning image set including unsupervised images based on information about a favorite image set previously prepared by the user. Therefore, the information processing apparatus 4000 is enabled to preferentially present an image high in degree of satisfaction from among a new image set input by the user.

Other Embodiments

Embodiment(s) of the present disclosure can also be realized by a computer of a system or apparatus that reads out and executes computer executable instructions (e.g., one or more programs) recorded on a storage medium (which may also be referred to more frilly as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-214625, filed. Nov. 7, 2017, which is hereby incorporated by reference herein in its entirety.

What is claimed is:

1. An information processing apparatus comprising:
one or more processors; and
one or more memories coupled to the one or more processors, the one or more memories having stored thereon instructions which, when executed by the one or more processors, cause the apparatus to:
a generate a first estimation model for estimating evaluation information about input data with use of a plurality of pieces of learning data having evaluation information as teacher information;
estimate evaluation information about each of the plurality of pieces of learning data with use of the first estimation model, associate the estimated evaluation information with corresponding learning data, and store the estimated evaluation information associated therewith;
estimate evaluation information about unsupervised data with use of the first estimation model;
associate unsupervised data with learning data based on a degree of similarity between an estimation result of evaluation information about the learning data and an estimation result of evaluation information about the unsupervised data;
a setting unit configured to set teacher information for unsupervised data based on the learning data associated with the unsupervised data; and
a second estimation model generation unit configured to generate a second estimation model for estimating evaluation information about input data with use of a plurality of pieces of learning data having the teacher information and the unsupervised data with the teacher information set thereto.

2. The information processing apparatus according to claim 1, wherein teacher information about the learning data associated with the unsupervised data is set as teacher information about the unsupervised data.

3. The information processing apparatus according to claim 1, wherein teacher information for the unsupervised data is derived from an estimation result of evaluation information about the unsupervised data based on a relationship between teacher information about the learning data associated with the unsupervised data and an estimation result of evaluation information about the unsupervised data.

4. The information processing apparatus according to claim 3, wherein unsupervised data is associated with learning data based on a degree of similarity between feature amounts extracted from learning data and unsupervised data.

5. The information processing apparatus according to claim 4, wherein teacher information for the unsupervised data is derived from an estimation result of evaluation information about the unsupervised data based on a degree of similarity in feature amount between learning data and unsupervised data.

6. The information processing apparatus according to claim 1, wherein the evaluation information is multivalued information which is a continuous value.

7. The information processing apparatus according to claim 1, wherein the instructions, when executed by the one or more processors, further cause the apparatus to verify performance of an estimation model learned with use of added unsupervised data.

8. The information processing apparatus according to claim 7, wherein with use of new learning data, the performance of the estimation model learned with use of the added unsupervised data is verified.

9. The information processing apparatus according to claim 7, wherein it is verified whether the estimation model learned with use of the added unsupervised data is inferior to the first estimation model in performance.

10. The information processing apparatus according to claim 9, wherein, if it is determined that the estimation model learned with use of the added unsupervised data is inferior to the first estimation model in performance, the added unsupervised data is excluded from learning data.

11. The information processing apparatus according to claim 1, wherein the instructions, when executed by the one or more processors, further cause the apparatus to classify a plurality of pieces of learning data into a plurality of clusters based on an estimation result of evaluation information about the learning data, and select, for every cluster, representative data from learning data included in the cluster.

12. The information processing apparatus according to claim 11, wherein only representative data of each cluster is regarded as learning data to perform association with unsupervised data.

13. The information processing apparatus according to claim 1, wherein the evaluation information is a normalized histogram.

14. The information processing apparatus according to claim 1, wherein the data is image data.

15. The information processing apparatus according to claim 14, wherein the evaluation information is a distribution of satisfaction evaluation performed by a plurality of users for image data.

16. The information processing apparatus according to claim 14, wherein the instructions, when executed by the one or more processors, further cause the apparatus to extract, from the plurality of pieces of learning data, image data similar in category to image data included in an image data group high in user satisfaction, and use a plurality of pieces of extracted learning data as learning data.

17. The information processing apparatus according to claim 16, wherein the instructions, when executed by the one or more processors, further cause the apparatus to extract image data high in user satisfaction from a plurality of pieces of unknown image data with use of the second estimation model, and present the extracted image data to a user.

18. The information processing apparatus according to claim 16, wherein teacher information for the unsupervised data is derived from an estimation result of the unsupervised data based on a degree of similarity between the unsupervised data and any one of pieces of image data included in the image data group high in user satisfaction.

19. An information processing method comprising:
generating a first estimation model for estimating evaluation information about input data with use of a plurality of pieces of learning data having evaluation information as teacher information;
estimating evaluation information about each of the plurality of pieces of learning data with use of the first estimation model, associating the estimated evaluation information with corresponding learning data, and storing the estimated evaluation information associated therewith;
estimating evaluation information about unsupervised data with use of the first estimation model;
associating unsupervised data with learning data based on a degree of similarity between an estimation result of evaluation information about the learning data and an estimation result of evaluation information about the unsupervised data;
setting teacher information for unsupervised data based on the learning data associated with the unsupervised data; and
generating a second estimation model for estimating evaluation information about input data with use of a plurality of pieces of learning data having the teacher information and the unsupervised data with the teacher information set thereto.

20. A non-transitory computer-readable storage medium storing a computer program that causes a computer to function as:

a first estimation model generation unit configured to generate a first estimation model for estimating evaluation information about input data with use of a plurality of pieces of learning data having evaluation information as teacher information;
a first evaluation information estimation unit configured to estimate evaluation information about each of the plurality of pieces of learning data with use of the first estimation model, associate the estimated evaluation information with corresponding learning data, and store the estimated evaluation information associated therewith;
a second evaluation information estimation unit configured to estimate evaluation information about unsupervised data with use of the first estimation model;
an association unit configured to associate unsupervised data with learning data based on a degree of similarity between an estimation result of evaluation information about the learning data and an estimation result of evaluation information about the unsupervised data;
a setting unit configured to set teacher information for unsupervised data based on the learning data associated with the unsupervised data; and
a second estimation model generation unit configured to generate a second estimation model for estimating evaluation information about input data with use of a plurality of pieces of learning data having the teacher information and the unsupervised data with the teacher information set thereto.

* * * * *